US012693628B2

(12) United States Patent
Yang et al.

(10) Patent No.: US 12,693,628 B2
(45) Date of Patent: Jul. 28, 2026

(54) HOLOGRAPHIC DISPLAY AND METHOD FOR GENERATING A HOLOGRAM

(71) Applicant: GACHON UNIVERSITY OF INDUSTRY-ACADEMIC COOPERATION FOUNDATION, Seongnam-si (KR)

(72) Inventors: Dae Ho Yang, Seongnam-si (KR); Yeo Ju Sohn, Seoul (KR)

(73) Assignee: GACHON UNIVERSITY OF INDUSTRY-ACADEMIC COOPERATION FOUNDATION, Seongnam-si (KR)

( * ) Notice: Subject to any disclaimer, the term of this patent is extended or adjusted under 35 U.S.C. 154(b) by 0 days.

(21) Appl. No.: 19/059,793

(22) Filed: Feb. 21, 2025

(65) Prior Publication Data

US 2026/0029751 A1     Jan. 29, 2026

(30) Foreign Application Priority Data

Jul. 29, 2024     (KR) ........................ 10-2024-0100422

(51) Int. Cl.
| | |
|---|---|
| *H04N 13/38* | (2018.01) |
| *G03H 1/22* | (2006.01) |
| *H04N 13/322* | (2018.01) |
| *H04N 13/383* | (2018.01) |
| *H04N 13/32* | (2018.01) |

(52) U.S. Cl.
CPC ......... *G03H 1/2286* (2013.01); *G03H 1/2202* (2013.01); *G03H 1/2294* (2013.01); *H04N 13/322* (2018.05); *H04N 13/383* (2018.05); *G03H 2222/20* (2013.01); *G03H 2223/14* (2013.01); *G03H 2223/55* (2013.01)

(58) Field of Classification Search
USPC ........................................................ 348/40
See application file for complete search history.

(56) References Cited

U.S. PATENT DOCUMENTS

| | | | | |
|---|---|---|---|---|
| 2013/0278631 A1* | 10/2013 | Border | ............... | G06F 3/04842 |
| | | | | 345/633 |
| 2015/0234187 A1* | 8/2015 | Lee | ...................... | G02B 26/005 |
| | | | | 345/8 |
| 2015/0234188 A1* | 8/2015 | Lee | ........................ | G02C 7/085 |
| | | | | 345/633 |

FOREIGN PATENT DOCUMENTS

| | | |
|---|---|---|
| JP | 2005-140932 A | 6/2005 |
| JP | 2011-501824 A | 1/2011 |

(Continued)

OTHER PUBLICATIONS

Communication issued Nov. 16, 2025 in Korean Application No. 10-2024-0100422.

*Primary Examiner* — Nigar Chowdhury
(74) *Attorney, Agent, or Firm* — Sughrue Mion, PLLC

(57) ABSTRACT

A holographic display includes a light source configured to emit incoherent light, a spatial light modulator (SLM) disposed at a Fourier plane of the light source and configured to modulate the incoherent light and emit the modulated incoherent light as diffused light, and at least one lens disposed downstream of the spatial light modulator and configured to focus the modulated incoherent light, and the spatial light modulator receives an RGB-D image signal and converts the incoherent light array incident from the light source into a first light, which is a coherently-reconstructed incoherent sum (CRIS) for implementing a 3D hologram.

10 Claims, 44 Drawing Sheets

(56)          References Cited

FOREIGN PATENT DOCUMENTS

JP              6238965  B2     11/2017
KR        10-0416479  B1      1/2004

* cited by examiner

SLM lens

Fourier plane

HOLOGRAPHIC DISPLAY AND METHOD FOR GENERATING A HOLOGRAM

CROSS-REFERENCE TO RELATED APPLICATION

This application claims priority from and the benefit of Korean Patent Application No. 10-2024-0100422 filed on Jul. 29, 2024, in the Korean Intellectual Property Office, the disclosure of which is incorporated herein by reference.

BACKGROUND OF THE DISCLOSURE

Field of the Disclosure

Example embodiments relate to holograms, and more specifically, to a holographic display and a hologram generation method for generating incoherent holograms to expand the eye box of a holographic display.

Description of the Related Art

Over the past few decades, hologram technology has steadily advanced and remains an active area of research. Unlike conventional displays, holographic displays are considered ideal 3D displays because they do not exhibit the phenomenon known as vergence-accommodation conflict. This is particularly important for AR/VR devices, where objects that are very close and very far away must often be displayed simultaneously. In such devices, the presence of vergence-accommodation conflict may significantly degrade image quality or cause rapid eye fatigue, making holographic displays essential. However, due to issues such as image quality, optical efficiency, and device size, the use of hologram technology in practical devices is still uncommon.

One of the most significant challenges in holographic displays is the limited eyebox (also known as the viewing angle). While real-world 3D objects scatter light in all directions, allowing them to be viewed from various angles, holograms implemented using display devices cannot scatter light in all directions due to the limitations of display pixel numbers. As a result, holograms may only scatter light in limited directions, restricting the area from which they may be viewed, which is referred to as the eyebox. Currently, the eyebox of holograms is only a few millimeters, which is extremely limited compared to conventional displays, making practical use difficult.

Holographic displays may only be viewed within a limited volume known as the eyebox due to the restricted space-bandwidth product of the spatial light modulator (SLM).

Various methods have been studied to overcome the limitations of the eyebox, which may be broadly categorized into active and passive approaches.

Active methods include gaze tracking and subsequent eyebox adjustment. For example, adjustable liquid crystal gratings have been adopted to direct light toward the pupil. Micro-mirror devices may also be utilized to select light sources corresponding to detected pupil positions within an array of light sources. In compact devices, pupil-replicating waveguides may be employed to reduce system volume while adjusting the angle of light incidence to move the eyebox. However, gaze-tracking-based technologies fail to meet response time expectations due to the long latency of gaze tracking.

In contrast, passive methods expand the eyebox by utilizing multiplexed components or scattering media, allowing holograms to be viewed without gaze tracking. These methods include using holographic optical elements to replicate the eyebox, enabling holograms to be viewed from multiple points. Lens arrays may be adopted to form sparse eyeboxes and extend the range of holographic displays. Scattering matrices may be placed in front of the SLM to increase the scattering angle of light, and the wavefield is optimized to reduce scattering noise.

However, passive methods face challenges such as limited image quality and unwanted interference patterns caused by experimental deviations, where the coherence of light dramatically reduces image quality.

RELATED ART DOCUMENTS

Patent Documents (Patent Document 1) Korean Patent 10-416479

SUMMARY

The objective of the present invention is to address the limitation of the eyebox and expand the eyebox of holographic displays by applying incoherent light, which may be decomposed into a sum of coherent light, to generate holograms in a holographic display and a hologram generation method.

It should be noted, however, that the problems addressed by the present invention are not limited to the aforementioned issues and may be extended in various ways without departing from the spirit and scope of the present invention.

One embodiment of the present invention provides a holographic display comprising: a light source configured to emit incoherent light; a spatial light modulator (SLM) disposed at the Fourier plane of the light source and configured to modulate the incoherent light and emit it as diffused light; and at least one lens disposed downstream of the spatial light modulator and configured to focus the modulated incoherent light, wherein the spatial light modulator receives RGB-D image signals and converts the incoherent light array incident from the light source into a first light, which is a Coherently-reconstructed Incoherent Sum (CRIS) of the incoherent light for implementing a 3D hologram.

The lens may be arranged to direct, the first light, for generating a 3D hologram, into a pupil located at the Fourier plane of the spatial light modulator.

Another embodiment of the present invention provides a method for generating a hologram using the holographic display, comprising: a first step of performing an optical propagation simulation to propagate, over a predetermined distance, first light that is a Coherently-reconstructed Incoherent Sum (CRIS) generated by the spatial light modulator upon receiving light from the light source, wherein arbitrary RGB-D image signals for implementing the hologram are input to the spatial light modulator; a second step of simulating the angles of light incident within the pupil and calculating the average intensity of the first light incident at each simulated angle; and a third step of optimizing the arbitrary pattern by comparing the average intensity of the first light with the intensity of the second light as the target light.

The first light is expressed as:

$$I_{CRIS}(\vec{r}, z) = \frac{1}{N}\sum_{\vec{k}_g}\left|\int_A U\left(\vec{k} + \vec{k}_g\right)e^{iz\sqrt{\left(\frac{2\pi}{\lambda}\right)^2 - |\vec{k}|^2}}\, e^{i\vec{k}\cdot\vec{r}}d\vec{k}\right|^2$$

where $$I_{CRIS}(\vec{r}, z)$$

represents the intensity of the first light, z is the distance along the longitudinal direction, N is a normalization constant, $$\vec{r}$$

is the distance vector from the center of the spatial light modulator, $$U(\vec{k})$$

is the Fourier transform function of the modulation signal of the spatial light modulator (SLM), $$\vec{k}$$

is the radial wavevector before modulation, $$\vec{k}_{g=(kx,ky)}$$

is the modulated radial wavevector, and A represents the area of the pupil in the Fourier plane (pupil plane, 41).

The Fourier transform function $$U(\vec{k}),$$

which satisfies $$I_{CRIS}(\vec{r}, z) = Itarget$$

(the intensity of the second light, which is the incoherent sum of the target light), may be derived and generated to create the desired first light.

The first light may have translational invariance, where the intensity of the first light remains the same regardless of the positional shift of the pupil.

This translational invariance may be expressed by introducing the positional vector of the pupil with respect to the center of the eye box $(p_x, p_y, p_z)$, as $$I_{CRIS}((\vec{r}, z, p_x, p_y, \ p_z) = I_{CRIS}(\vec{r}, z, 0, 0, 0).$$

Here, $$I_{CRIS}(\vec{r}, z)$$

represents the intensity of the first light, and z is the distance along the longitudinal direction.

The first light may be implemented by deriving a Fourier transform function $$U(\vec{k})$$

that satisfies $$I_{CRIS}(\vec{r}, z) = Itarget$$

is the intensity of the second light, which is the incoherent sum of the target light.

According to an embodiment of the present invention, a novel passive method may be provided to address the limited eye box of holographic displays while delivering image quality and responsiveness comparable to conventional holographic displays.

According to an embodiment of the present invention, the expanded volume of the CRIS may be extended to over 1,000 times larger than the unexpanded eye box without any degradation in image quality.

The effects of the present invention are not limited to those mentioned above, and other effects not explicitly described herein will be clearly understood by those skilled in the art from the following description.

BRIEF DESCRIPTION OF THE FIGURES

Embodiments will be described in more detail with regard to the figures, wherein like reference numerals refer to like parts throughout the various figures unless otherwise specified, and wherein:

FIG. 3 depicts various reconstructed images of CRIS.

DETAILED DESCRIPTION OF THE DISCLOSURE

Figure 1A:
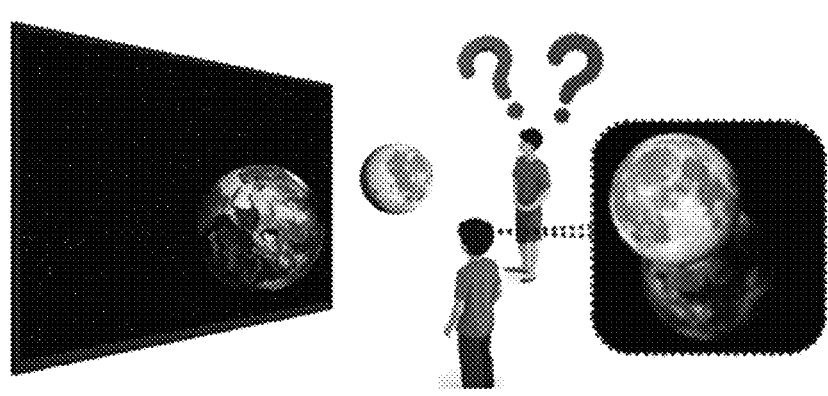
FIGS. 1A to 1E are diagrams illustrating examples of CRIS implementations.

The embodiments of the present invention disclosed in this specification include specific structural or functional descriptions that are illustrated solely for the purpose of explaining the embodiments of the invention. The embodiments of the invention may be implemented in various forms and are not limited to the examples described in this specification.

The embodiments of the present invention are subject to various modifications and may take multiple forms, and thus the embodiments are illustrated in the drawings and described in detail in the specification. However, these are not intended to limit the embodiments of the invention to specific forms of disclosure, but to include modifications, equivalents, or substitutions that fall within the spirit and scope of the invention.

The terms "first," "second," and the like may be used to describe various components but should not be understood to limit the components by these terms. These terms are only used to distinguish one component from another. For example, within the scope of the invention; a first component may be referred to as a second component and vice versa.

When a component is described as being "connected to" or "coupled to" another component, it may be directly connected or coupled, or there may be intermediate components. In contrast, if a component is described as being "directly connected to" or "directly coupled to" another component, it should be understood that no intermediate components are present. Similarly, terms describing the relationships between components, such as "between," "immediately between," or "directly adjacent to," should be interpreted in the same manner.

The terms used in this specification are intended to describe particular embodiments and are not intended to limit the invention. Singular expressions include plural forms unless the context clearly indicates otherwise. Terms such as "comprises" or "has" specify the presence of stated features, numbers, steps, operations, components, parts, or their combinations, and do not exclude the possibility of the presence or addition of one or more other features, numbers, steps, operations, components, parts, or their combinations.

Unless otherwise defined, all terms used herein, including technical and scientific terms, have the same meaning as commonly understood by those skilled in the art. Terms defined in dictionaries should be interpreted as having meanings consistent with the context of the relevant technology and should not be construed in an overly idealized or formal sense unless expressly defined in this specification.

The holographic display and hologram generation method of the present invention scatter light at various angles using an incoherent light source. Conventional displays faced limitations in scattering light at various angles due to a lack of sufficient pixels.

The holographic display and hologram generation method of the present invention implement incoherent light by combining lasers with optical diffusers or using LEDs.

Moreover, the holographic display and hologram generation method of the present invention address the difficulty of accurately implementing holograms when scattering light in all directions. To overcome this, the method confines the operation within experimentally known pupil size ranges, performs hologram computation based on the size of the pupil, and ensures that spatially incoherent light completely fills the pupil to generate the hologram.

By applying a spatially incoherent light source rather than temporally incoherent light, the eye box is expanded.

Additionally, the holographic display and hologram generation method of the present invention involve displaying arbitrary patterns on a spatial light modulator (SLM) for hologram implementation, performing an optical propagation simulation to propagate light over a certain distance, simulating the angles of light entering the pupil, calculating the average intensity of the light entering at those angles, and optimizing the arbitrary pattern by comparing the calculated average intensity with the target intensity.

In addition, the holographic display and hologram generation method of the present invention implement a consistent 3D holographic image regardless of the viewing position by applying the first light, which is a Coherently Reconstructed Incoherent Sum (CRIS) expressed by the following Equation 1.

$$I_{CRIS}(\vec{r}, z) = \frac{1}{N} \sum_{\vec{k}_g} \left| \int_A \overline{U}(\vec{k} + \vec{k}_g) e^{iz\sqrt{\left(\frac{2\pi}{\lambda}\right)^2 - |\vec{k}|^2}} e^{i\vec{k}\cdot\vec{r}} d\vec{k} \right|^2 \qquad \text{[Equation 1]}$$

Here, $$I_{CRIS}(\vec{r}, z)$$

represents the intensity of the first light, z is the distance along the longitudinal direction, N is a normalization constant, $$\vec{r}$$

is the distance vector from the center of the spatial light modulator, $$U(\vec{k})$$

is the Fourier transform function of the modulation signal of the spatial light modulator 20, $\vec{r}$ is the radial wavevector before modulation, $$\vec{k}_{g=(kx,ky)}$$

is the modulated radial wavevector, and A is the area of the pupil in the Fourier plane (pupil plane, 41).

The first light may be generated by deriving a Fourier transform function $$U(\vec{k})$$

that satisfies $$I_{CRIS}(\vec{r}, z) = Itarget,$$

where Itarget is the intensity of the second light, which is the incoherent sum of the target light.

By introducing the positional vector of the pupil 40 with respect to the center of the eye box px, py, pz a translational invariance equation as shown in [Equation 2] may be derived.

$$I_{CRIS}(\vec{r}, z) = I_{target} \text{ (the intensity of the second light,} \qquad \text{[Equation 2]}$$

which is the incoherent sum of the target light)

The following describes the embodiments in detail with reference to the accompanying drawings. However, the scope of the patent application is not limited or restricted by these embodiments. The same reference numerals in the drawings denote the same elements.

FIGS. 1A to 1E are diagrams illustrating examples of CRIS implementations.

In FIGS. 1A to 1E, reference numeral 11 represents light sources from different positions, 11a indicates incoherent light, 11b represents the sum of incoherent light reconstructed as coherent light (first light), and 11C shows light focused by lens 30 and incident on pupil 40.

FIG. 1A illustrates a point-shaped eye box limited by the space-bandwidth product of the spatial light modulator 20 (Spatial Light Modulator, SLM).

Figure 1B:
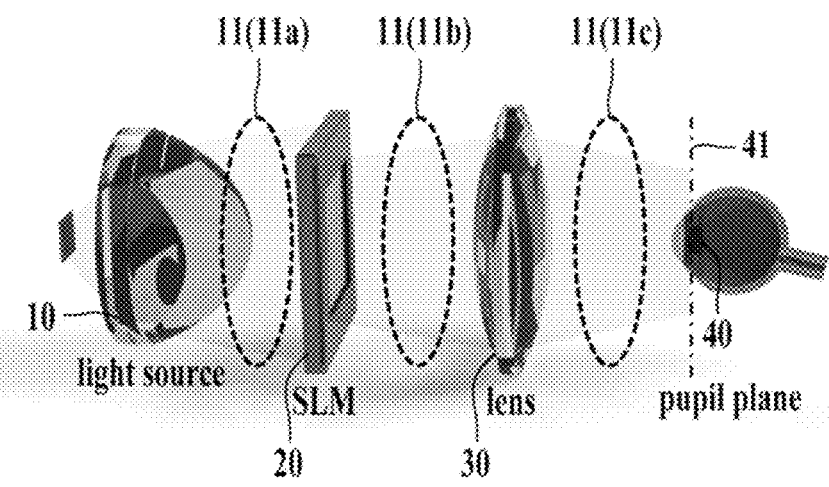

FIG. 1B shows the configuration of a holographic display 1 according to an embodiment of the present invention for implementing CRIS (Coherently-reconstructed incoherent sum). To achieve the sum of incoherent light propagated coherently in a wavefield, the spatial light modulator 20 must be located at the Fourier plane of the light source, and the pupil 40 should be near the Fourier plane of the spatial light modulator 20.

Figure 1C:
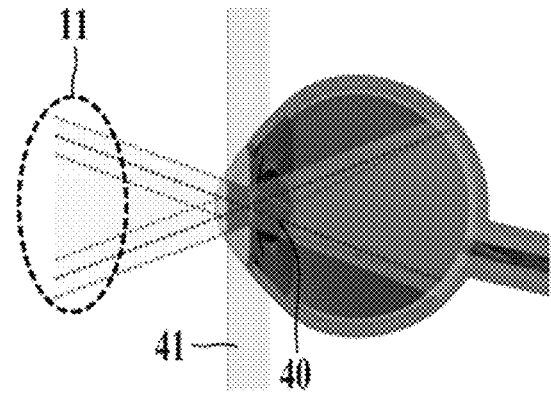

FIG. 1C represents a subset of incoherent light passing through pupil 40. To numerically simulate the reconstructed intensity, only the light passing through pupil 40 among numerous illuminations needs to be considered.

Figure 1D:
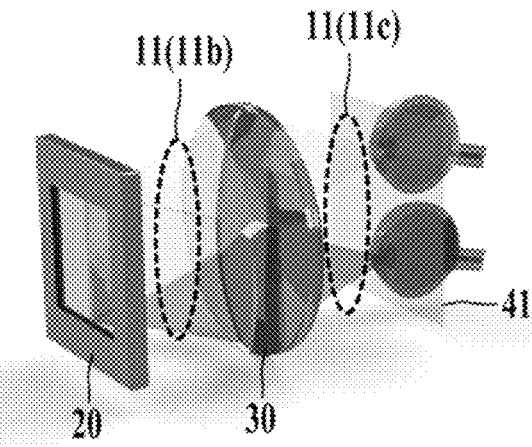

FIG. 1D depicts the paths of two selected subsets of incoherent light for different pupil 40 positions.

Figure 1E:
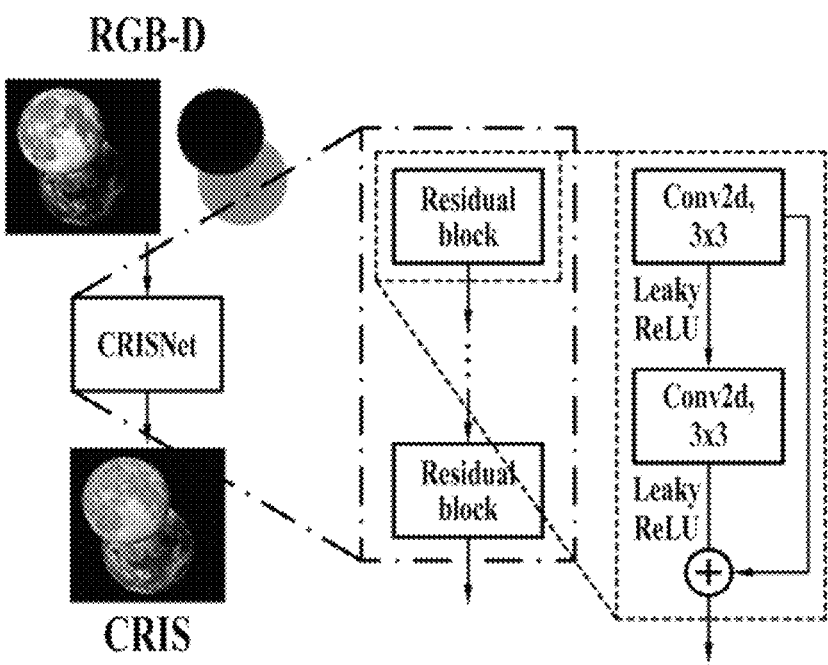

FIG. 1E illustrates the structure of CRISNet, which takes an RGB-D image as input and outputs a modulation for CRIS.

When incoherent light is directed onto the spatial light modulator 20, the modulated light spreads at a wide angle. The expanded incident angle enables a field of view to be secured from all regions, overcoming the diffraction angle limitations of the SLM in conventional holographic displays.

However, incoherent light generally does not create interference, making it challenging to reconstruct arbitrary 3D scenes. To utilize the interfering characteristics, the spatial light modulator 20 is positioned at the Fourier plane of the light source, ensuring that light from a single point of the light source forms a plane wave with a specific incident angle on the spatial light modulator 20 plane. With consideration of only specific incident angles, spatial coherence exists, and light modulated by the spatial light modulator 20 may reconstruct arbitrary 3D wavefields. Conversely, light with different incident angles does not interfere due to discrepancies between the light waves.

When multiple incident lights modulated by the spatial light modulator 20 pass through another lens 30, the light is Fourier-transformed by lens 30 at a specific plane (FIG. 1B).

For collimated incident light using a radial wavevector (kgx, kgy) the light is focused at the point (fλk$_{gx}$/2π, fλk$_{gy}$/2π) on the Fourier plane, where λ is the wavelength of the light, and f is the focal length of lens 30. By placing pupil 40 on the Fourier plane, only a portion of the incident light, specifically the part concentrated within the region, is allowed. Therefore, only a subset of the incident light is imaged through the aperture of pupil 40, and the total intensity may be expressed by Equation 1 (FIG. 1C).

$$I_{CRIS}(\vec{r}, z) = \frac{1}{N}\sum_{\vec{k}_g}\left|\int_A U(\vec{k} + \vec{k}_g)e^{iz\sqrt{\left(\frac{2\pi}{\lambda}\right)^2 - |\vec{k}|^2}} e^{i\vec{k}\cdot\vec{r}}d\vec{k}\right|^2 \qquad \text{[Equation 1]}$$

Here, $$I_{CRIS}(\vec{r}, z)$$

represents the intensity of the first light, z is the distance along the longitudinal direction, N is a normalization constant, $$\vec{r}$$

is the distance vector from the center of the spatial light modulator, $$U(\vec{k})$$

is the Fourier transform function of the modulation signal of the spatial light modulator 20, $$\vec{k}$$

is the radial wavevector before modulation, $$\vec{k}_{g=(kx,ky)}$$

is the modulated radial wavevector, and A is the area of the pupil in the Fourier plane (pupil plane 41).

The first light may be generated by deriving a Fourier transform function $$U(\vec{k})$$

that satisfies $$I_{CRIS}(\vec{r}, z) = I_{target},$$

where $I_{target}$ is the intensity of the second light, which is the incoherent sum of the target light, as expressed in Equation 1.

By introducing the positional vector of pupil 40 with respect to the center of the eye box (px, py, pz), a translational invariance equation as shown in [Equation 2] may be derived.

$$I_{CRIS}(\vec{r}, z) = I_{target}(\text{the intensity of the second light,} \qquad \text{[Equation 2]}$$

$$\text{which is the incoherent sum of the target light})$$

Since Equation 2 is valid under the Fresnel approximation, the reconstructed intensity of the first light remains unchanged even if pupil 40 moves along any axis within the region where the Fresnel approximation holds. In other words, by finding an appropriate Fourier transform function $$U(\vec{k})$$

that satisfies $$I_{CRIS}(\vec{r}, z) = I_{target},$$

a wavefield may be displayed to reconstruct a 3D scene viewable from any position. This translational invariance may be understood as a cancellation between the grating phase of the incident angle and the shift in the Fourier domain.

When pupil 40 moves in the Fourier plane, the specific incident angle of light passing through the center of pupil 40 may be identified (FIG. 1D). Under the Fresnel approximation, the light has the same wavefield as light with an incident angle of 0, except for the oscillatory phase induced by the incident angle.

The same principle may be applied to off-axis illumination. Consequently, the sum of incoherent light remains identical to the case where pupil 40 is at the center. The translational invariance of CRIS may also be applied to movement along the z-axis.

Gradient descent may be used to find a wavefield that satisfies Equation 1. For an arbitrary initial wavefield, the right-hand side of Equation 1 is computed, and the difference between the sum of mismatched components and the target intensity is calculated. The wavefield is then updated to minimize the difference, and the process may be repeated until a predefined number of iterations is reached.

To numerically simulate the propagation of incoherent light, coherent propagation is calculated for 400 different incident angles, and all the coherent propagation results are incoherently summed. Consequently, synthesizing a single hologram requires repeating the 400 coherent propagations hundreds of times, making the algorithm impractical for real-time applications.

To overcome this limitation, a neural network (CRISNet) was trained, consisting of residual blocks with 3×3 convolutional layers (FIG. 1E). To train multi-depth holograms, incoherent propagation was numerically calculated for each depth and compared with depth-dependent target images.

Depth-dependent target images may be synthesized by multiplying an all-in-focus image with a mask where only the pixels corresponding to each specific depth are non-zero.

As a result, the total loss function may be expressed by Equation 3:

$$\mathcal{L} = \sum_n M(\vec{r}, d_n)\left[I_{CRIS}(\vec{r}, d_n) - I_{target}(\vec{r})\right] \qquad \text{[Equation 3]}$$

Here, $d_n$ is the distance between the n-th layer and the spatial light modulator 20, $$M(\vec{r}, d_n)$$

is the mask for the pixels of the n-th layer, $$\vec{r}$$

is the distance vector from the center of the spatial light modulator, and $$I_{target}(\vec{r})$$

is the target intensity of the first light.

FIGS. 2A to 2F are diagrams illustrating the numerical reconstruction of CRIS, and FIG. 3 depicts various reconstructed images of CRIS.

Figure 2A:
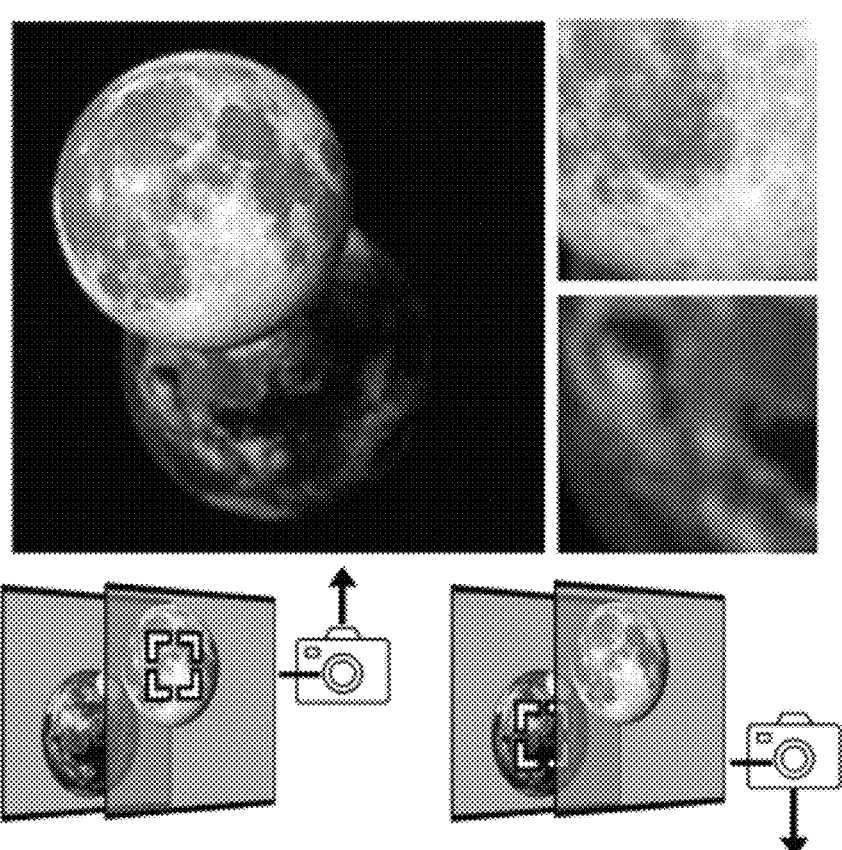
FIGS. 2A to 2F are diagrams illustrating the numerical reconstruction of CRIS.
Figure 2B:
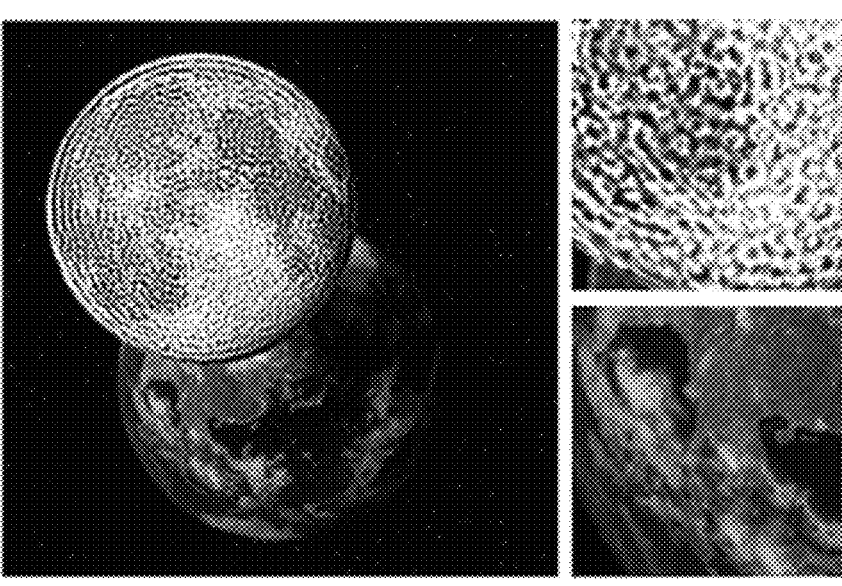

FIGS. 2A and 2B show 3D scenes of numerically reconstructed CRIS. The moon is located on the front plane, while the Earth is on the plane of the spatial light modulator 20. When the focus is on the front, the moon is reconstructed clearly (FIG. 2A), and when the focus is on the spatial light modulator 20 plane, the Earth is reconstructed clearly (FIG. 2B).

Figure 2C:
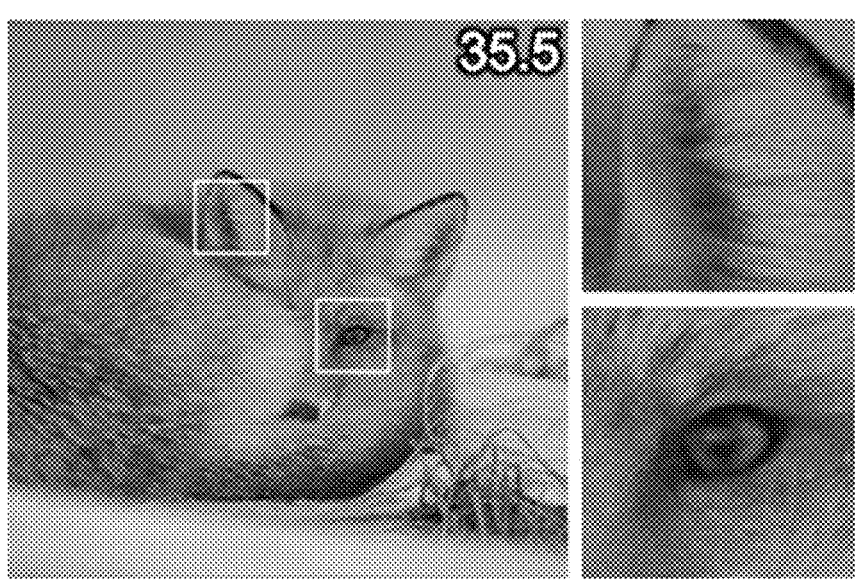

FIG. 2C illustrates a numerically reconstructed stationary 2D scene to evaluate image quality metrics. The PSNR (Peak Signal-to-Noise Ratio) in dB is shown in the upper right corner, and the inset represents an enlarged image.

Figure 2D:
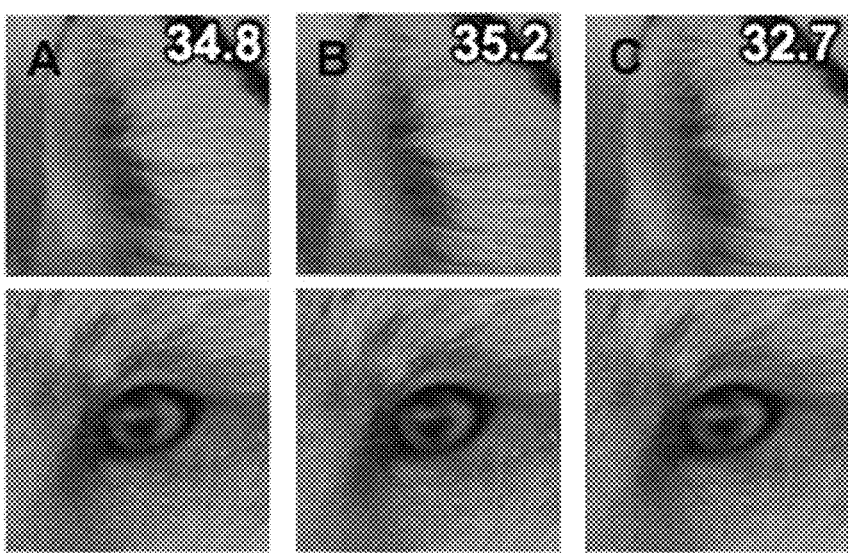

FIG. 2D shows enlarged images of numerically reconstructed intensities as a function of pupil 40 position. The pupil 40 positions for each image correspond to $$\left(0, \frac{L_e}{\sqrt{2}}\right), \left(\frac{L_e}{\sqrt{2}}, 0\right), \text{ and } \left(\frac{L_e}{\sqrt{2}}, \frac{L_e}{\sqrt{2}}\right).$$

Figure 2E:
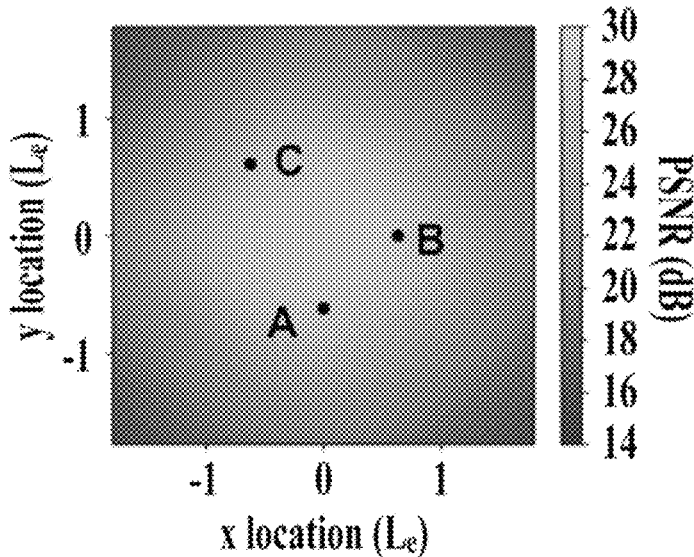

FIG. 2E depicts the average PSNR as a function of pupil 40 position. The positions are normalized by the eye box length Le.

Figure 2F:
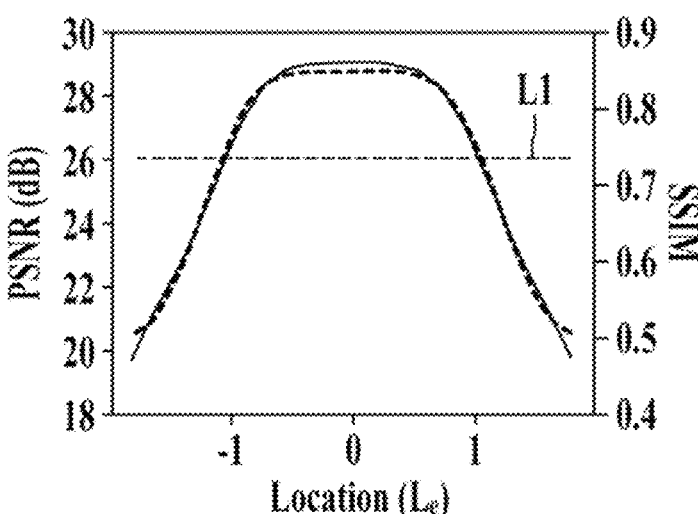
Figure 3A:
FIGS. 3A to 3F are a diagram depicting various reconstructed images of CRIS.
Figure 3B:
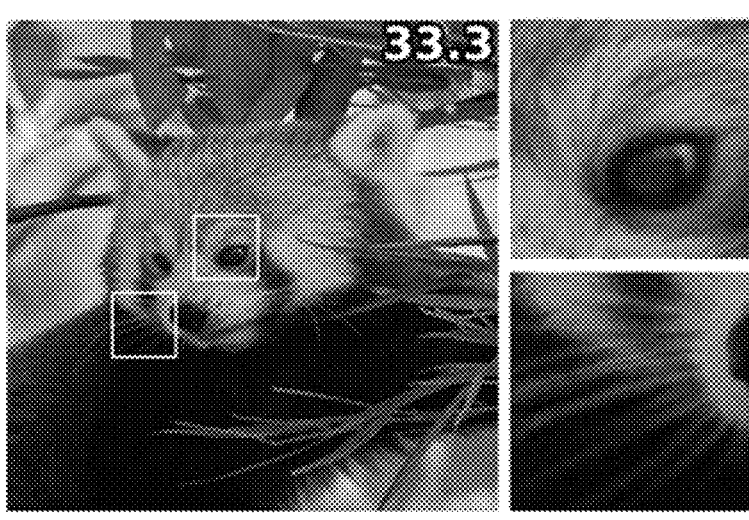
Figure 3C:
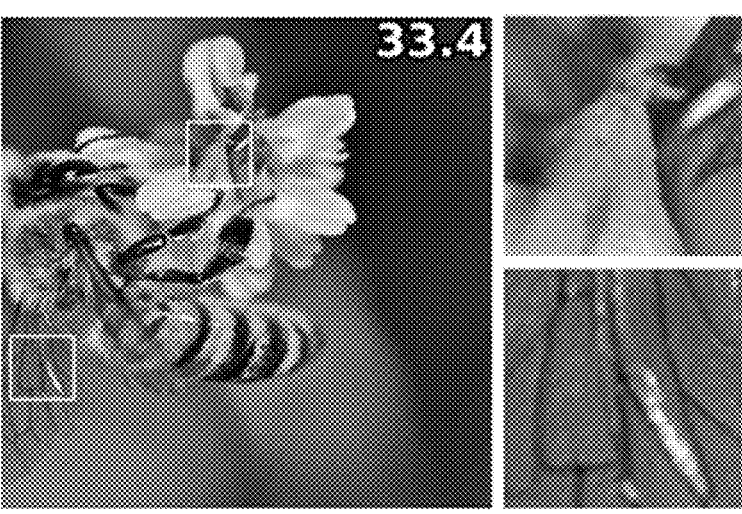
Figure 3D:
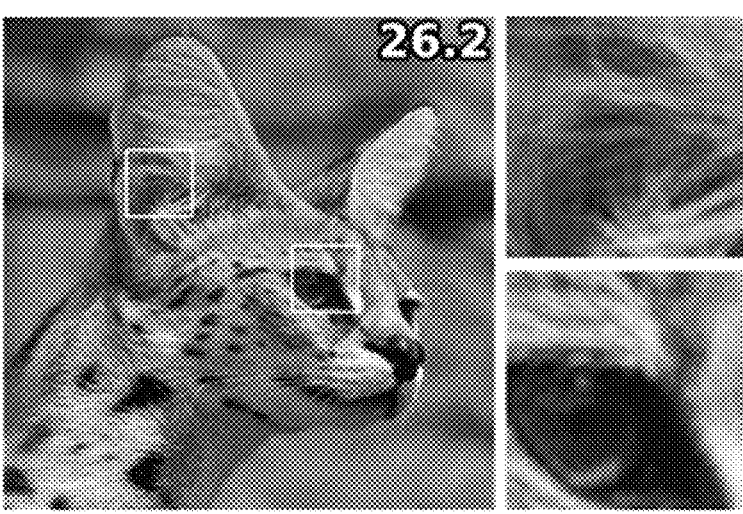
Figure 3E:
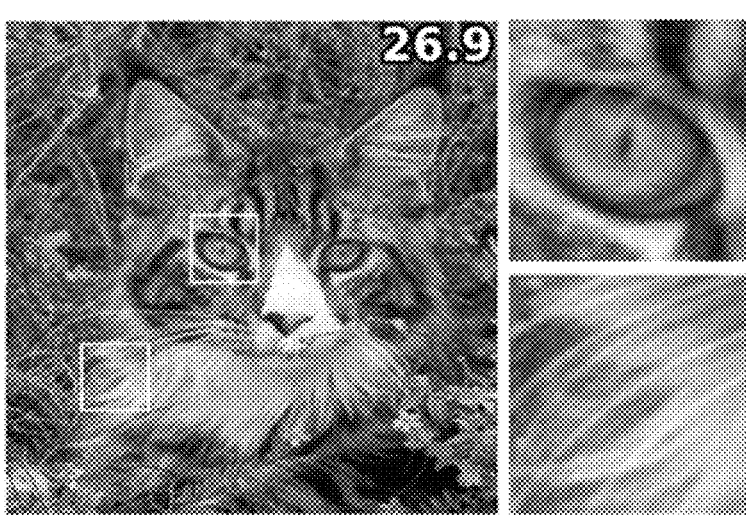
Figure 3F:
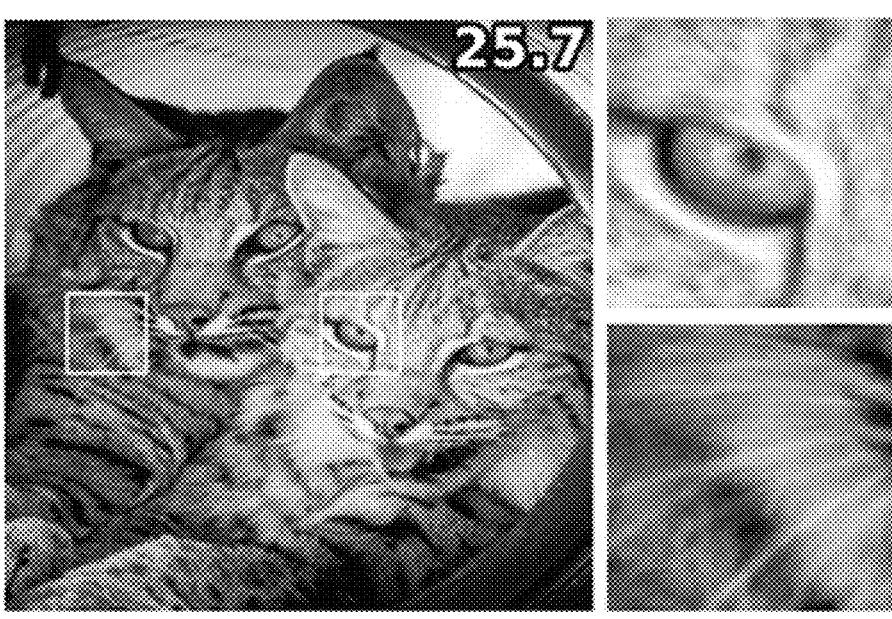

FIG. 2F is a graph showing the average PSNR and SSIM (Structural Similarity Index Measure) as a function of the pupil 40 position along the x-axis. The dashed line (L1) represents the −3 dB line of the maximum PSNR.

By synthesizing CRIS, a scene may be reconstructed where the moon is in the foreground and the Earth is on the spatial light modulator 20 plane. The numerical reconstruction demonstrates that when the focus is on the foreground, the moon remains sharp while the Earth appears blurry, indicating 3D reconstruction (FIG. 2A). In contrast, when the focus is on the spatial light modulator 20 plane, the Earth becomes sharp (FIG. 2B).

FIGS. 3A to 3F show images from the Flickr2K dataset that are numerically reconstructed (FIGS. 3A, 3B, 3C) and optically reconstructed (FIGS. 3D, 3E, 3F) when the eye position is at the center of the eye box. The PSNR (Peak Signal-to-Noise Ratio) in dB is displayed at the top right corner, and the insets represent enlarged images.

Considering that most image quality metrics are designed for 2D images, the DIV2K validation dataset, a 2D image dataset, was used to quantitatively analyze the image quality of CRIS.

To simulate floating objects, it was assumed that the image was positioned 1.5 diopters away from the spatial light modulator 20 plane. Here, 1.5 diopters correspond to the average arm's length. The average PSNR of the numerically reconstructed floating images is 29 dB at the center of the eye box, and one of the images with an enlarged inset may be found in FIG. 2C.

FIGS. 3A to 3F illustrate additional intensities of numerically reconstructed images for various target images.

To demonstrate the translational invariance of CRIS, the same image may be numerically reconstructed at different positions within the eye box (FIG. 2D). Theoretically, the half-length of the eye box along the x-axis and y-axis is given by $Le=(8\lambda f_2/D)^{1/4}$, where D is the diopter, and f is the focal length. Each point in FIG. 2D corresponds to $$\left(0, \frac{L_e}{-\sqrt{2}}\right), \left(\frac{L_e}{\sqrt{2}}, 0\right), \text{ and } \left(\frac{L_e}{-\sqrt{2}}, \frac{L_e}{\sqrt{2}}\right).$$

To visualize the image quality distribution, CRIS was synthesized for all images in the dataset, and the PSNR values calculated through numerical reconstruction were averaged for each pupil 40 position.

FIG. 2E shows the average PSNR as a function of the x and y positions in units of Le. Since translational invariance does not extend beyond the valid range of the Fresnel approximation, the average PSNR decreases near the distance Le, confirming the validity of the theoretical results. The cross-sectional graph also confirmed that the full width at half maximum (FWHM) of the PSNR is (FIG. 2F).

The length of the eye box does not depend on the pixel pitch of the spatial light modulator 20. Therefore, increasing the focal length of lens 30 allows for the use of a spatial light modulator 20 with a larger physical size, enabling the eye box to be expanded while maintaining the field of view.

Additionally, as the diopter of the hologram increases, the length of the eye box decreases. However, doubling the diopter reduces the eye box length by approximately 15%, which is inversely proportional to the fourth root of the diopter. Under typical conditions, the eye box length of a glass-type display ranges from 10 to 15 mm, while that of a flat-panel display ranges from 50 to 100 mm.

FIGS. 4A to 4E are diagrams illustrating the optical reconstruction of CRIS.

Figure 4A:
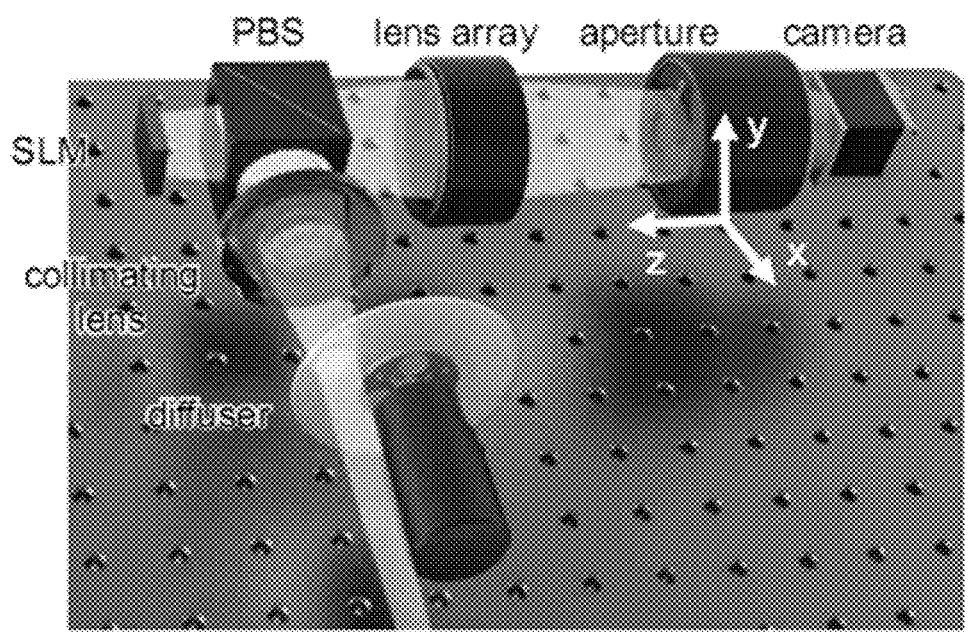
FIGS. 4A to 4E are diagrams illustrating the optical reconstruction of CRIS.

FIG. 4A shows the experimental setup. Collimated RGB laser beams are scattered by a diffuser and then collimated by another lens 30. An amplitude-only spatial light modulator 20 with a polarizing beam splitter cube (PBS) is used to reconstruct the hologram. A camera with a lens 30 and an aperture captures the optically reconstructed hologram as its position is adjusted along the x, y, and z directions.

Figure 4B:
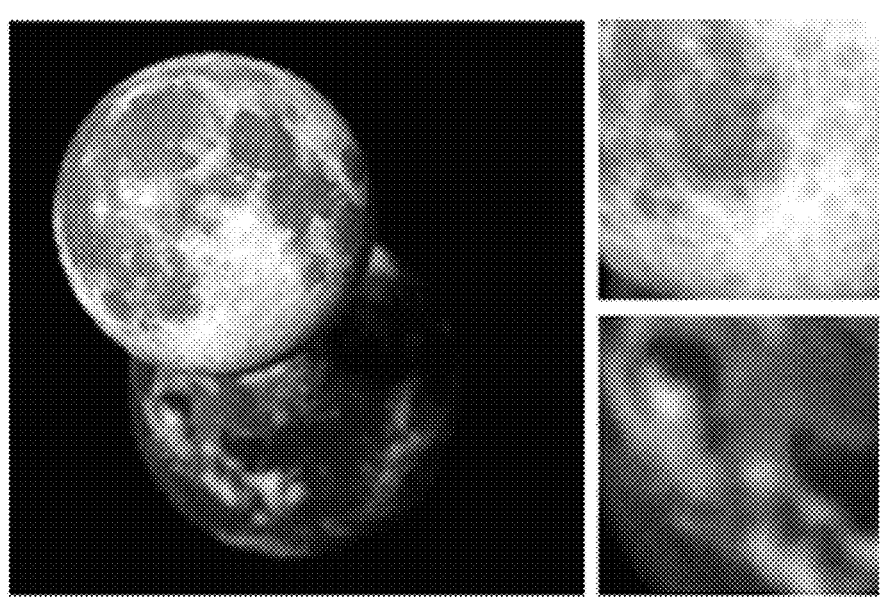
Figure 4C:
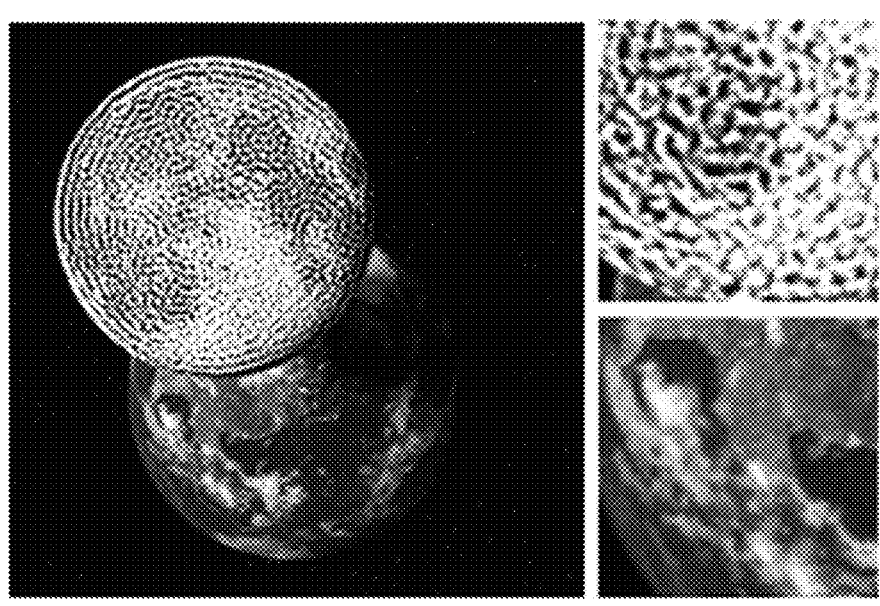

Optically reconstructed images of the moon and Earth CRIS are displayed when the camera focus is on the foreground (FIG. 4B) and on the spatial light modulator 20 plane (FIG. 4C).

Figure 4D:
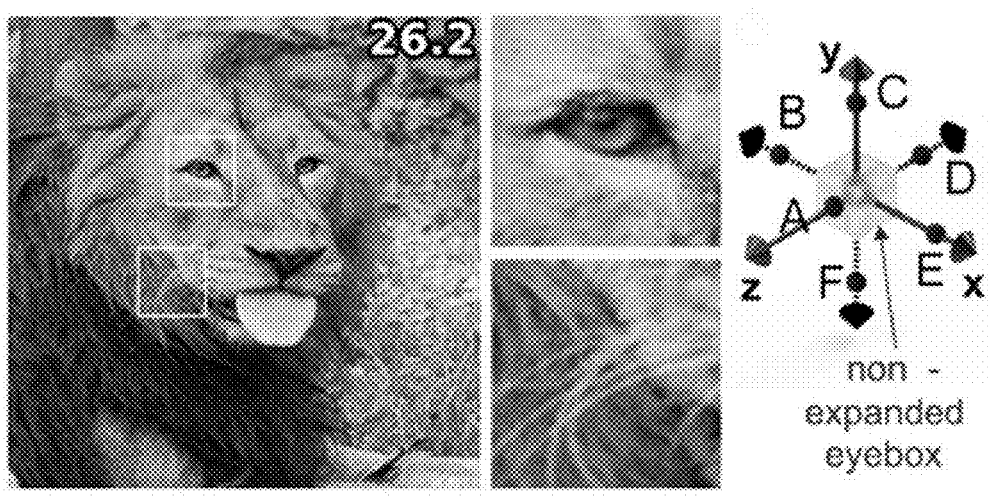

FIG. 4D shows an optically reconstructed 2D scene floating 1.5 diopters above the spatial light modulator 20 plane. The PSNR in dB is displayed in the top right corner, and the inset represents an enlarged image.

Figure 4E:
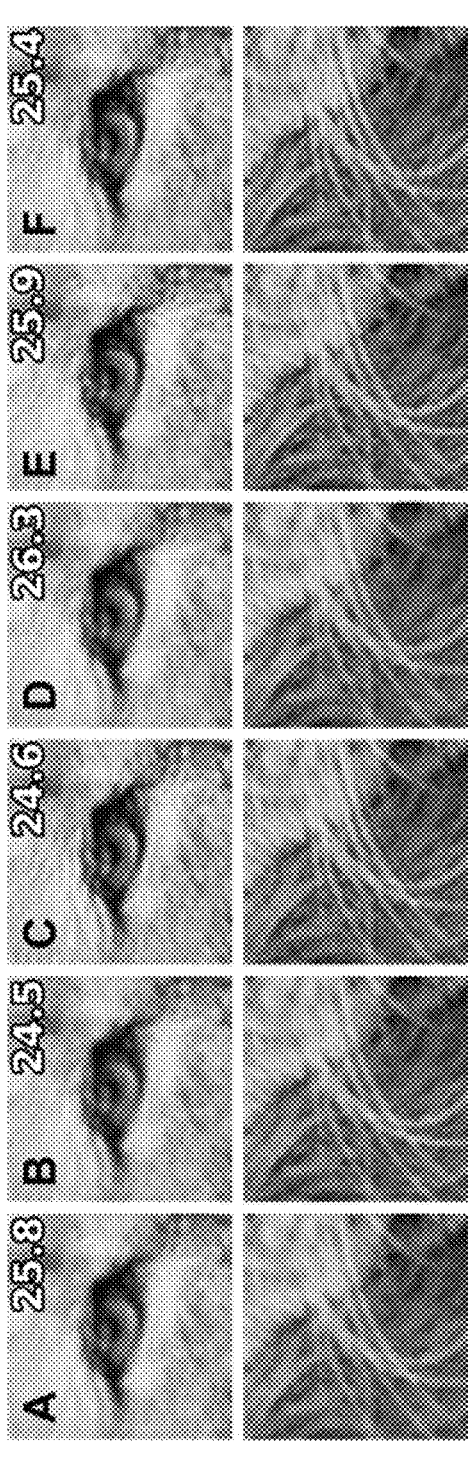

FIG. 4E depicts enlarged images of optically reconstructed intensities as a function of the pupil 40 position. The axes indicate the positions normalized by the length of the unexpanded eye box.

FIGS. 5A to 5F illustrate 3D reconstructions at various different positions of pupil 40.

Figure 5A:
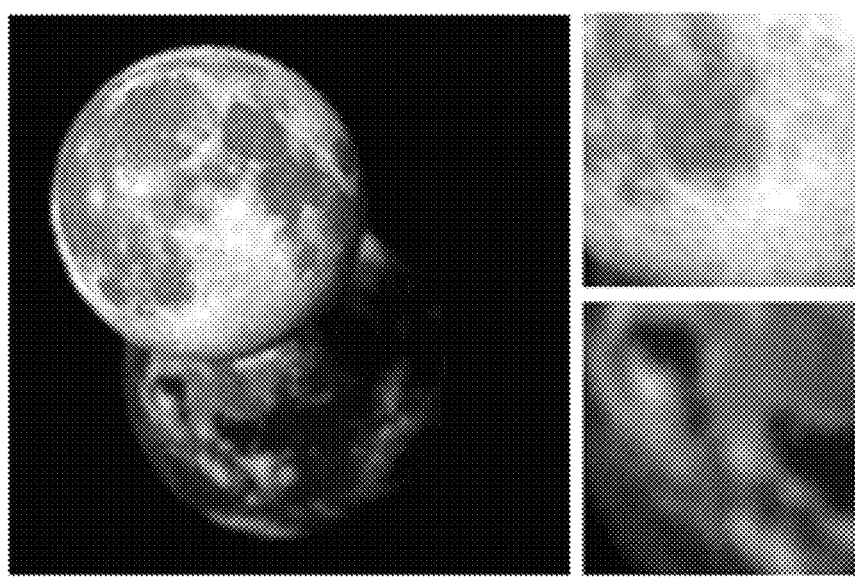
FIGS. 5A to 5F illustrate 3D reconstructions at various different positions of pupil.
Figure 5B:
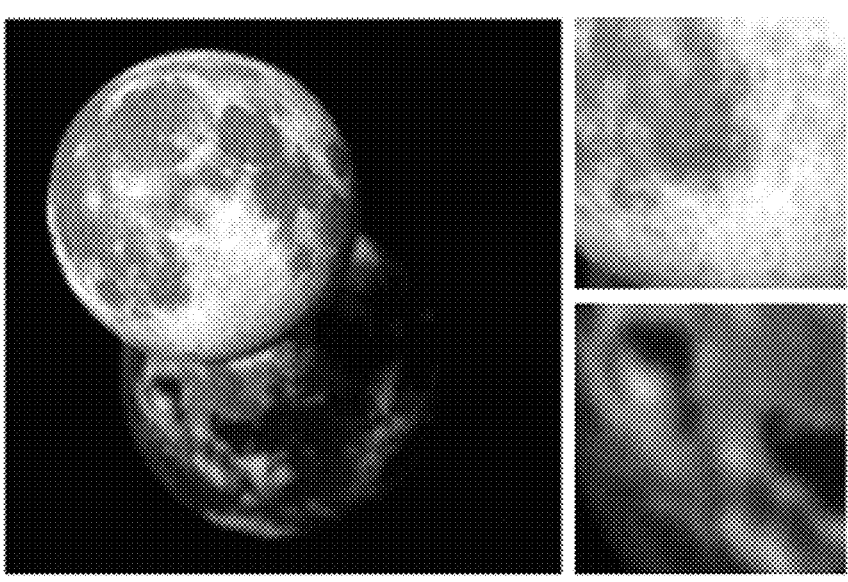
Figure 5C:
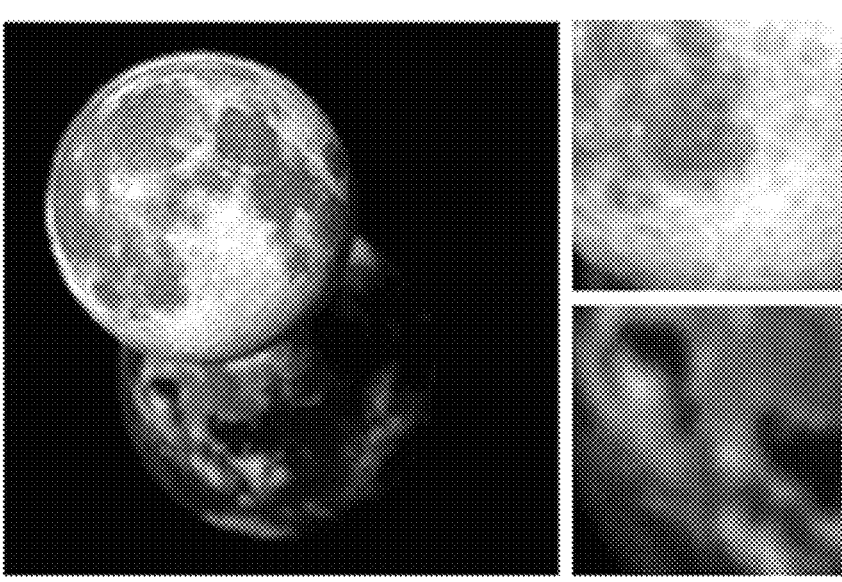
Figure 5D:
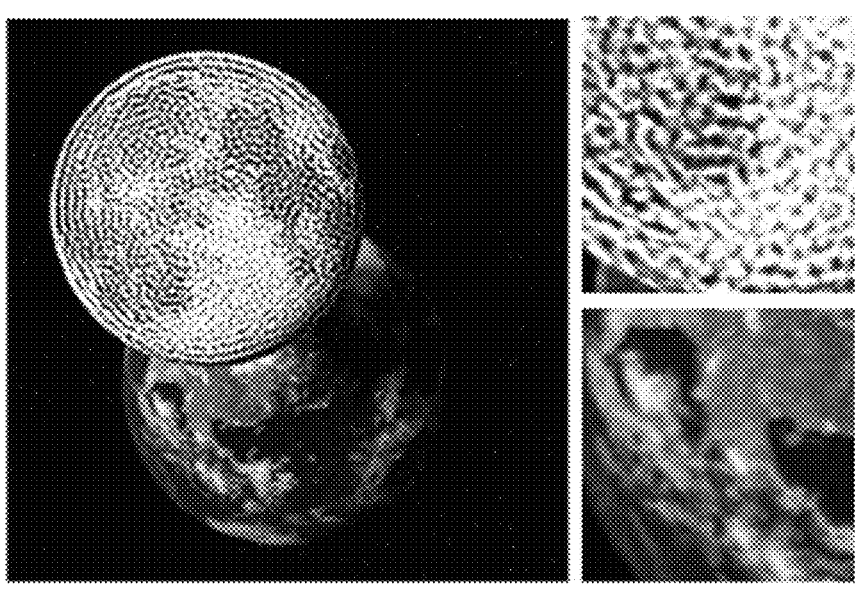
Figure 5E:
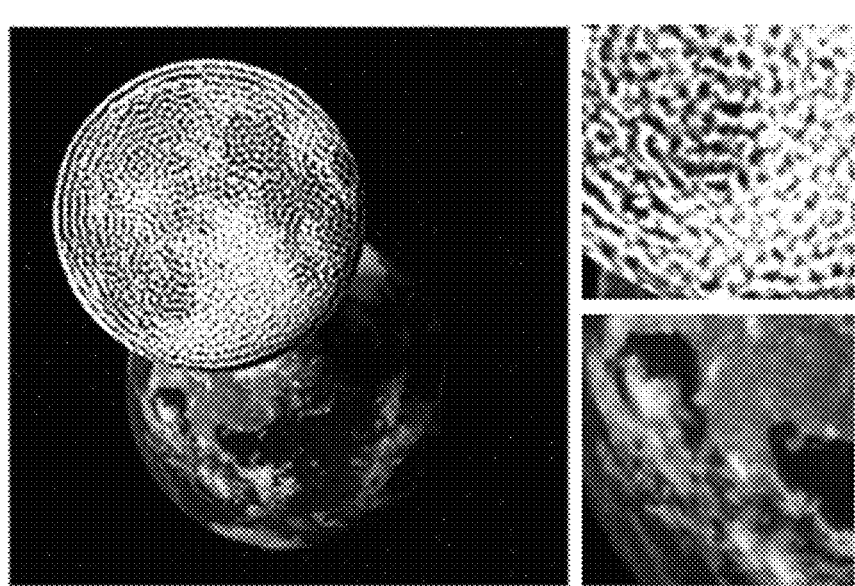
Figure 5F:
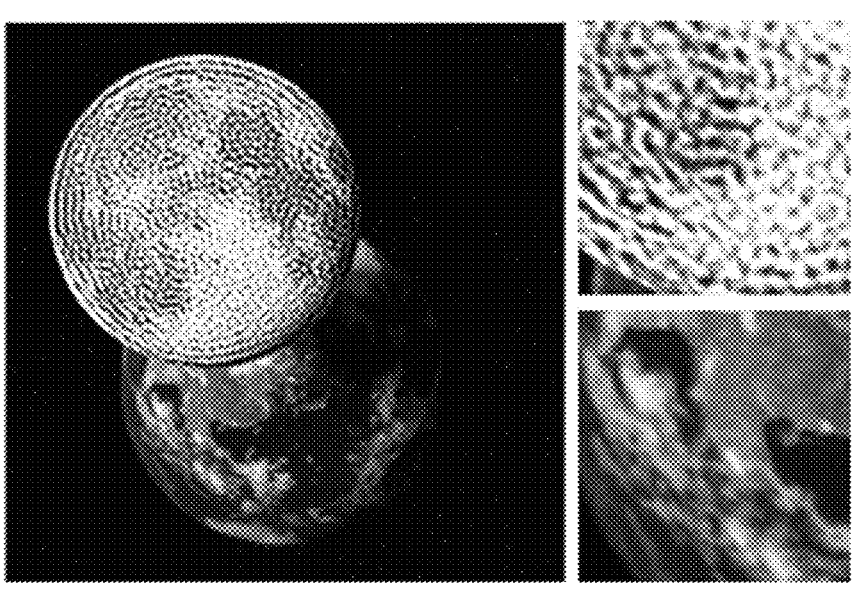

The 3D scenes are optically reconstructed for various pupil 40 positions when the camera focus is on the foreground (FIGS. 5A, 5B, 5C) and on the spatial light modulator 20 plane (FIGS. 5D, 5E, 5F). Each pupil 40 position in FIGS. 5A, 5B, and 5C corresponds to points A, B, and C in FIG. 3F.

To confirm the translational invariance of CRIS, the optical reconstruction of the hologram was performed (FIG. 4). While spatial coherence must be suppressed to implement CRIS, it is ideal to maintain temporal coherence for high image quality.

To create an ideal light source for CRIS, red, blue, and green lasers were combined into a single-mode optical fiber, and a rotating diffuser was used to suppress spatial coherence. Despite using temporally coherent light in the experiments, it was speculated that image quality could be maintained even without temporal coherence.

An amplitude-only spatial light modulator 20 was used to optically reconstruct CRIS, while CRIS was synthesized to be represented only in amplitude. Unlike conventional holograms, the Fourier plane is filled with light from various incident angles, making it impossible to use a Fourier filter. Thus, all images reconstructed and benchmarked in numerical reconstructions use an amplitude-only spatial light modulator 20.

Using the same 3D scene presented in the numerical reconstruction, the optical reconstruction showed a sharp moon and a blurry Earth when the camera focus was on the foreground (FIG. 4B). When the camera focus was on the spatial light modulator 20 plane, the Earth became sharp, indicating successful 3D reconstruction (FIG. 4C).

The suppressed spatial coherence prevents speckle noise caused by laser interference and diffraction patterns from dust, which are major noise sources in conventional holograms, thereby providing high image quality. Additional 3D scenes for various pupil 40 positions are shown in FIG. 5.

To evaluate image quality metrics based on aperture position, 2D floating images were optically reconstructed, and the PSNR was evaluated as the aperture position varied. FIG. 4E shows an optically reconstructed image with an enlarged inset when the aperture is at the center of the eye box. Even when the aperture moved beyond the boundaries of the unexpanded eye box, the image quality remained similar (FIG. 4F).

In addition, unlike conventional holograms, the movement of the aperture along the z-axis did not affect image quality or the field of view. Theoretically, the eye box volume is $12\times12\times53$ mm$^3$, which corresponds to 1,000 times the volume of the unexpanded eye box under the experimental conditions.

However, due to the limited number of apertures in the setup, the light source area that the optical system may accommodate is restricted. Experimentally, the measured eye box volume was $4.5\times4.5\times12$ mm$^3$, corresponding to a 32-fold expansion.

The following provides the mathematical basis for the equations used in the present invention.

* Translational Invariance Property under the Fresnel Approximation

According to the Angular Spectrum Method (ASM), the Fourier-transformed wavefield, U, may be expressed as Equation 4.

$$\overline{U}(k_x, k_y, z) =$$
$$\overline{U}(k_x, k_y, 0)e^{iz\sqrt{k^2 - k_x^2 - k_y^2}} \approx \overline{U}(k_x, k_y, 0)e^{ikz\left(1 - \frac{k_x^2 + k_y^2}{2k^2}\right)}$$

[Equation 4]

As a result, the propagated wavefield U(x, y, z) may be expressed as Equation 5.

$$U(x, y, z) = \int \int \overline{U}(k_x, k_y, 0) \times e^{ikz\left(1 - \frac{k_x^2 + k_y^2}{2k^2}\right)} e^{ik_x x + ik_y y} dk_x dk_y$$

[Equation 5]

Since the pupil 40 of the eye functions like an aperture, only the limited region A should be integrated into Equation 5 to numerically reconstruct the visible intensity. By considering spatially incoherent light as the incoherent sum of numerous coherent lights, Equation 5 may be used to represent a hologram reconstructed by coherent light.

When considering coherent light with different incident angles, the grating phase $$e^{-ik_{gx}x - ik_{gy}y}$$

must be applied to the wavefield before propagation U(x, y, 0). Utilizing the properties of the Fourier transform, $$\overline{U}(k_x, k_y, 0)$$

changes to $$\overline{U}(k_x + k_{gx}, k_y + k_{gy}, 0)$$

under the grating phase.

By integrating holograms reconstructed with coherent light at different incident angles, the sum of incoherent light may be expressed as Equation 6.

$$I(x, y, z, p_x, p_y) = \frac{1}{N} \sum_{k_{gx}, k_{gy}}$$
$$\left| \int \int_{A(p_x, p_y)} \overline{U}(k_x + k_{gx}, k_y + k_{gy}, 0) \times e^{ikz\left(1 - \frac{k_x^2 + k_y^2}{2k^2}\right)} e^{ik_x x + ik_y y} dk_x dk_y \right|^2$$

[Equation 6]

Here, A($p_x$, $p_y$) represents the area corresponding to the position of the pupil. The pupil 40 is defined as a circle with a center at (px, py) and a radius pr.

To explicitly represent the dependency of the integration area on the pupil 40 position, kx and ky are shifted, and Equation 6 is rewritten.

Considering that f is the focal length of lens 30 used to perform the spatial Fourier transform, the shifted wavevectors may be defined as $k_x = k'_x \equiv k_{px}$, $k_y = k'_x \equiv k_{py}$, $k_{px} \equiv k_{px}/f$, $k_{py} \equiv k_{py}/f$ The transformed equation is provided as Equation 7.

$$I(x, y, z, p_x, p_y) = \frac{1}{N} \sum_{k_{gx}, k_{gy}}$$
$$\left| \int \int_{A(0,0)} \overline{U}(k'_x + k_{px} + k_{gx}, k'_x + k_{py} + k_{gy}, 0) \times e^{ikz\left(1 - \frac{(k'_x + k_{px})^2 + (k'_x + k_{py})^2}{2k^2}\right)} e^{i(k'_x + k_{px})x + i(k'_x + k_{py})y} dk'_x dk'_y \right|^2$$

[Equation 7]

Since the range of $k_{gx}$($k_{gy}$) is from negative infinity to positive infinity, $k_{gx}$($k_{gy}$) may be arbitrarily shifted. Thus, $k_{gx}$($k_{gy}$) may be replaced with $k_{gx}$ $k_{px}$ ($k_{gy}k_{py}$).

By substituting $k_{gx}$($k_{gy}$) and performing simple calculations, the result becomes Equation 8.

$$I(x, y, z, p_x, p_y) = \frac{1}{N} \sum_{k_{gx}, k_{gy}}$$
$$\left| \int \int_{A(0,0)} \overline{U}(k'_x + k_{gx}, k'_x + k_{py} + k_{gy}, 0) + e^{ikz\left(1 - \frac{k'^2_x + k'^2_y}{2k^2}\right)} e^{ik'_x\left(x - \frac{xk_{px}}{k}\right) + ik'_y\left(y - \frac{xk_{py}}{k}\right)} dk'_x dk'_y \right|^2$$

[Equation 8]

During the calculation process, $$e^{-ikz\left(\frac{k^2_{px}}{2k^2} + \frac{k^2_{py}}{2k^2}\right)} e^{ik_{px}x + ik_{py}y}$$

is eliminated. Since it does not include $k'_x$ or $k'_y$ the pure phase term may be removed during the computation of the squared magnitude.

To clarify the result, x(y) is replaced with $$x + \frac{zk_{px}}{k}\left(y + \frac{zk_{py}}{k}\right).$$

[Equation 9]

$$I\left(x + \frac{p_x}{f}z, y + \frac{p_y}{f}z, z, p_x, p_y\right) =$$
$$\frac{1}{N} \sum_{k_{gx}, k_{gy}} \left| \int \int_{A(0,0)} \overline{U}(k'_x + k_{gx}, k'_y + k_{gy}, 0) \times e^{ikz\left(1 - \frac{k'^2_x + k'^2_y}{2k^2}\right)} e^{ik'_x x + ik'_y y} dk'_x dk'_y \right|^2 = I(x, y, z, 0, 0)$$

On the right-hand side of Equation 9, I(x, y, z, 0, 0) does not depend on px and py, whereas the left-hand term does. Therefore, Equation 9 may be transformed into the form of Equation 10.

$$I(x, y, z, p_x, p_y) = I\left(x - \frac{p_x}{f}z, y - \frac{p_y}{f}z, z, 0, 0\right)$$

[Equation 10]

15

FIGS. 6A to 6D illustrate the schematic arrangement of the spatial light modulator 20, lens 30, and pupil 40 for translational invariance of the pupil and effective eye box calculation.

Figure 6A:
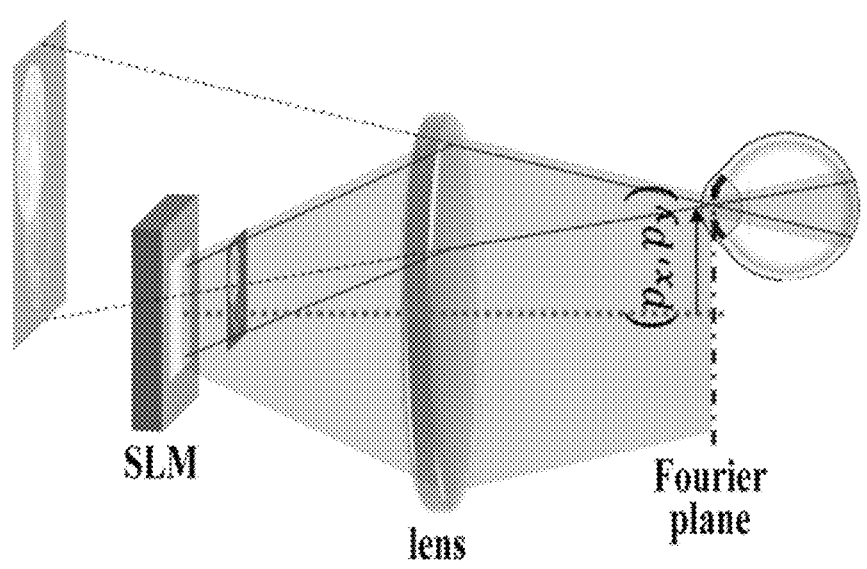
FIGS. 6A to 6D illustrate the schematic arrangement of the spatial light modulator, lens, and pupil for translational invariance of the pupil and effective eye box calculation.

FIG. 6A shows the coordinates for pupil 40 movement along the x-axis and γ-axis. For the pupil position (px, py), the virtual image of the reconstructed hologram remains in the same location relative to the eye.

Figure 6B:
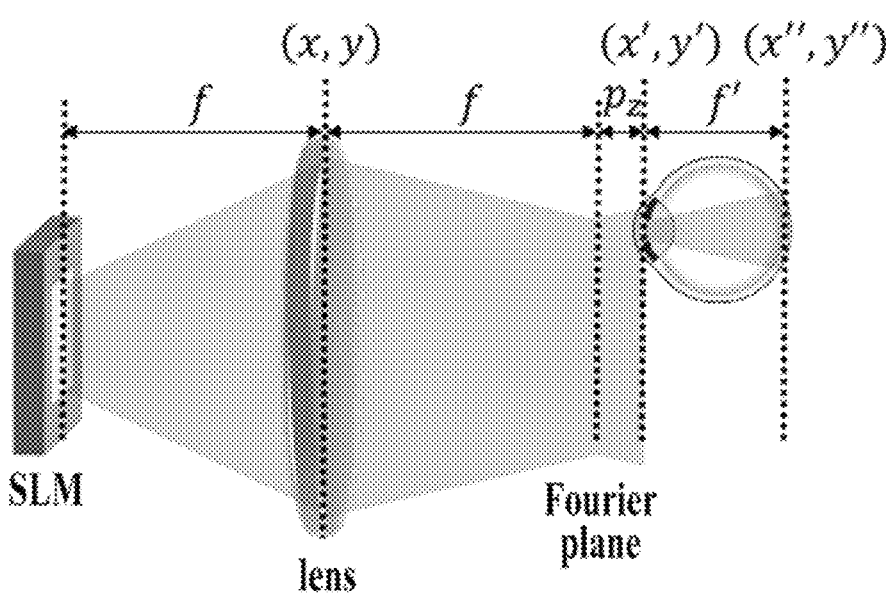

FIG. 6B shows the coordinates for pupil 40 movement along the z-axis. The pupil 40 moves by pz along the z-axis in the Fourier plane, and the coordinates used in the calculation are indicated at the top of the dotted line.

Figure 6C:
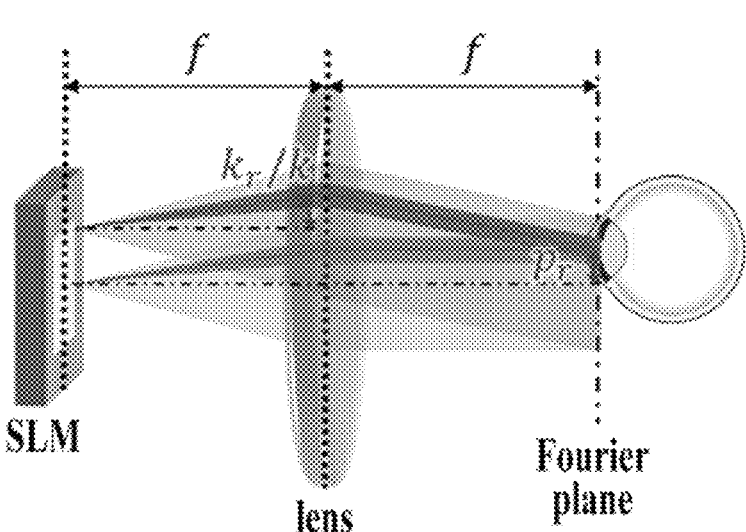

As shown in FIG. 6C, for pupil 40 movement in the radial direction, the radial wavevector of light passing through pupil 40 may be expressed as a function of the pupil 40 position.

Figure 6D:
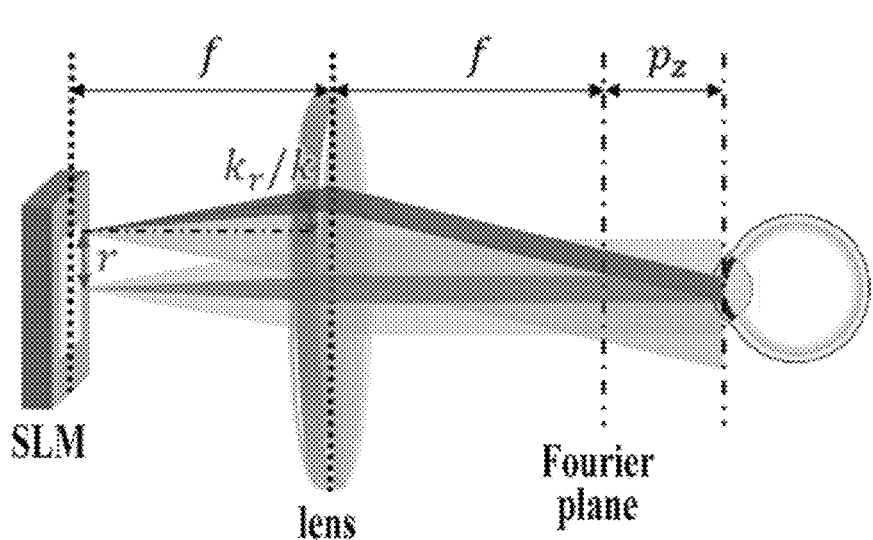

As shown in FIG. 6D, when pupil 40 moves along the z-axis, the radial wavevector of light passing through pupil 40 may be expressed as a function of both the pupil 40 position and the wavefield position.

The reconstructed intensity shifts by $$\left(\frac{p_x}{f}z, \frac{p_y}{f}z\right)$$

according to Equation 10; however, the intensity perceived by the eye does not shift because the eye itself also moves. This condition may be easily understood by visualizing the optically reconstructed virtual image created by lens 30 (FIG. 6A).

In other words, the observed intensity of the hologram reconstructed by spatially incoherent light does not depend on the position of pupil 40, allowing the hologram to be viewed from any position.

\* Generalization of Translational Invariance Along the z-Axis

To describe pupil 40 movement along the z-axis, the complete optical propagation from the spatial light modulator 20 to the retina must be calculated.

Propagation may be calculated using the following procedure (FIG. 6B).

1. Propagation over a distance of f
2. Phase change by the lens 30 with a focal length of f
3. Propagation over a distance of f+pz
4. Phase change by the eye lens 30 with a focal length of f′
5. Propagation over a distance of f′

After a simple calculation based on the Fresnel approximation, the wavefield at the retina may be given as Equation 11.

$$U(x, x, f + f + p_z + f') = \qquad \text{[Equation 11]}$$

$$\frac{1}{N_0}\int\int e^{-ik_x x\left(\frac{f}{f'}\right)-ik_y y\left(\frac{f}{f'}\right)}U(k_x, k_y, 0)dk_x dk_y$$

Here, $N_0$ is the normalization constant.

The right-hand side of Equation 11 remains unaffected by the movement of pupil 40 along the z-axis (pz), resulting in translationally invariant intensity formed on the retina. The only change is the magnification determined by the focal length ratio f/f.

In summary, by combining the results of the previous subsection with Equation 11, the translational invariance property may be expressed as Equation 12.

$$I(x, y, z, p_x, p_y, p_z) = I(x, y, z, 0, 0, 0) \qquad \text{[Equation 12]}$$

\* 3D Eye Box Size

According to Equation 12, the reconstructed intensity does not vary with the position of pupil 40. However, the fundamental limitation of CRIS lies in the Fresnel approximation, and the size of the eye box is constrained by the valid region of the Fresnel approximation.

Considering a plane wave with a radial wavevector (kx, ky) originating from the spatial light modulator 20, the Fresnel approximation condition may be expressed as Equation 13.

$$\frac{d}{8\lambda}\left(\frac{k_r}{k}\right)^4 \ll 1 \qquad \text{[Equation 13]}$$

Here, $$k_r = \sqrt{k_x^2 + k_y^2},$$

d is the propagation distance, λ is the wavelength of the light, and k is the magnitude of the wavevector. More specifically, the expansion of the CRIS eye box arises from the cancellation of grating phases at the incident angle due to the shift in the Fourier domain. However, when the incident angle becomes large, the approximation $$d\sqrt{k^2 - k_r^2} \approx kd\left(1 - \frac{k_r^2}{2k^2}\right)$$

breaks down, and the cancellation becomes incomplete.

A plane wave with a radial wavevector (kx, ky) is focused at the point (fkx/k, fky/k) on the Fourier plane, and the light is filtered by the pupil 40 (FIG. 6C).

Assuming that the radius of pupil 40 is smaller than the distance between the optical axis and the center of pupil 40, all radial wavevectors of plane wave light passing through pupil 40 may be approximated as (kx, ky).

The magnitude of the radial wavevector of light passing through pupil 40 may be expressed as Equation 14.

$$\frac{k_r}{k} = \frac{1}{f}\sqrt{p_x^2 + p_y^2} \qquad \text{[Equation 14]}$$

Here, the position of pupil 40 is set as (px, py, 0).

When pupil 40 moves along the z-axis, kr depends on the distance r from the center of the spatial light modulator 20. As shown in FIG. 6D, the magnitude of the wavevector may be calculated as $$\frac{k_r}{k} = \frac{rp_z}{f^2},$$

and the maximum wavevector magnitude occurs at the edge of the field of view (FoV).

Rewriting in terms of the FoV, the maximum wavevector magnitude may be expressed as Equation 15.

$$\frac{k_{r,MAX}}{k} \approx \frac{1}{f} p_z \frac{FoV}{2} \qquad \text{[Equation 15]}$$

By combining Equations 14 and 15, the relationship of the eye box may be expressed as Equation 16.

$$\frac{k_{r,MAX}}{k} \approx \frac{1}{f} \sqrt{p_x^2 + p_y^2 + p_z^2 \left(\frac{FoV}{2}\right)^2} \qquad \text{[Equation 16]}$$

By applying Equations 13 and 16, the eye box may be expressed as Equation 17.

$$\frac{1}{f} \sqrt{p_x^2 + p_y^2 + p_z^2 \left(\frac{FoV}{2}\right)^2} < a_0 \left(\frac{\lambda}{d}\right)^{1/4} \approx a_0 \left(\frac{\lambda}{Df^2}\right)^{1/4} \qquad \text{[Equation 17]}$$

Here, $$a_0 = 8^{1/4}, D \approx \frac{d}{f^2}$$

represents the diopter depth. The condition of "very small" may be adjusted to "small" based on $(kr/k)^4$.

From Equation 17, it may be understood that the CRIS eye box is an ellipsoid, and its volume varies depending on the depth of the hologram.

By restricting pupil 40 movement along the x-axis (e.g., py=0, pz=0), the length of the eye box along the x-axis may be calculated as $$\frac{|p_x|}{f} < a_0 \left(\frac{\lambda}{Df^2}\right)^{\frac{1}{4}}.$$

Considering the parameters used in the numerical reconstruction, the angular eye box is ±0.28 radians, which is nearly identical to the numerically calculated value of ±0.29 radians. This discrepancy may be explained by the fact that the eye box criterion in the numerical reconstruction is based on the FWHM (Full Width at Half Maximum) of image quality, whereas the criterion in Equation 17 is based on the initial point of image quality degradation.

For a typical glass-type display (e.g., focal length 25 mm, wavelength 515 nm, 2 diopters), the eye box length along the x-axis and γ-axis is 12 mm.

For a much larger flat-panel display (e.g., focal length 1000 mm, wavelength 515 nm, 3 diopters), the eye box length along the x-axis and γ-axis is 68.5 mm, and the eye box length along the z-axis may be (2/FoV)×68.5 mm.

The eye box does not depend on the pixel pitch or the number of pixels in the display.

* Experimental Setup

Lasers with wavelengths of 638 nm, 515 nm, and 450 nm were combined using a single-mode optical fiber, and the lasers were spatially decorrelated by a rotating diffuser. The spatially incoherent light collimated by lens 30 was illuminated through a PBS (polarizing beam splitter), and only modulated light passed through the PBS.

An amplitude-only modulator (IRIS-F55, MAY Inc.) with a resolution of 1920×1080 and a pixel pitch of 6.3 µm was used to modulate the light. However, for optical reconstruction, only the 1080×1080 area was used to minimize noise caused by the limited aperture size. The lens 30 array formed the Fourier plane of the hologram, and an aperture mounted on a motorized stage was configured to move near the Fourier plane. As a result, the aperture mimicked the movement of a human iris.

The calibration of the spatial light modulator 20 was performed by assigning a single value to the entire modulator and measuring the modulated intensity. After measuring the intensity, a fit function of output-to-input was applied to the input values to correct the modulation.

The LCOS modulation of the wavefield varies depending on the incident angle, but this difference is negligible if the angular difference is less than 10 degrees. To extend the field of view beyond 10 degrees, a digital micromirror device may be adopted to minimize modulation dependence on the incident angle.

* Dependence on Pupil Area

Figure 7A:
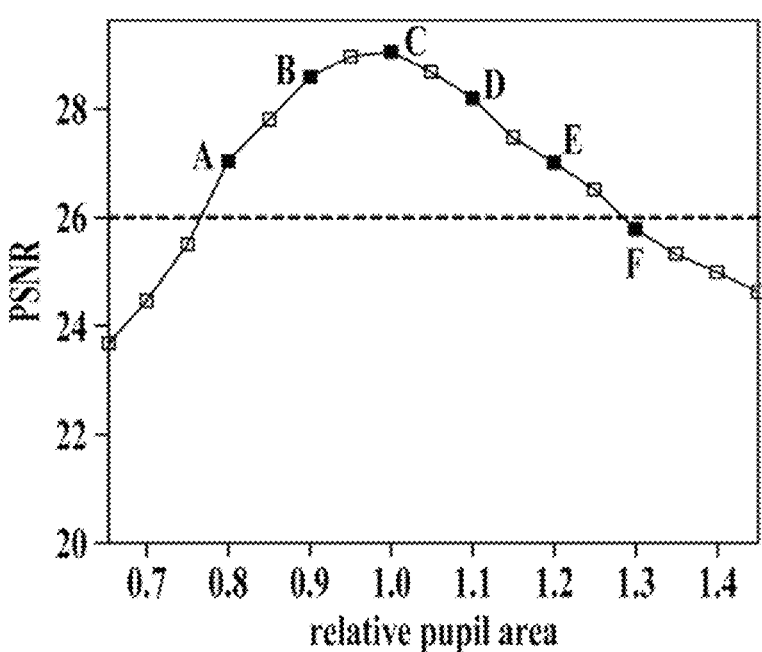
FIGS. 7A to 7C are diagrams illustrating the dependence on pupil area and computation time.
Figure 7B:
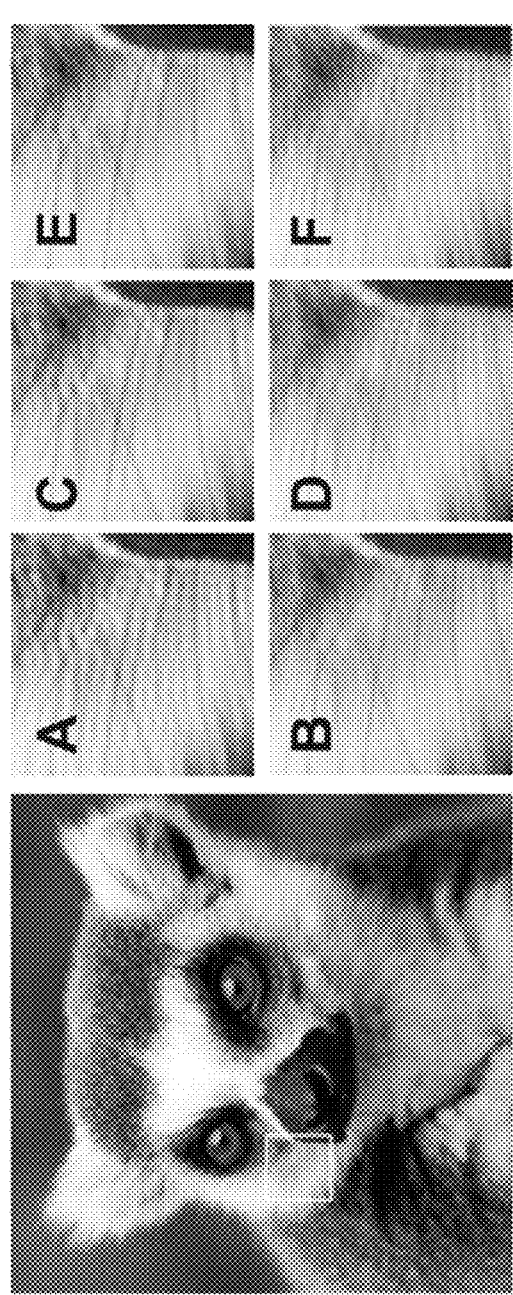
Figure 7C:
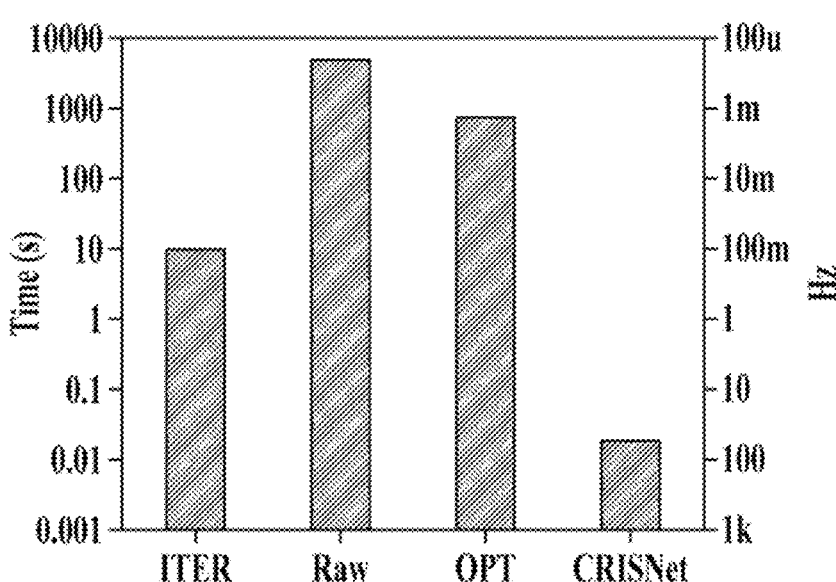

FIGS. 7A to 7C are diagrams illustrating the dependence on pupil 40 area and computation time.

FIG. 7A is a graph showing the average PSNR as a function of the relative pupil 40 area. The PSNR was evaluated using the DIV2K validation dataset. The dashed line (L2) represents the −3 dB line from the maximum PSNR.

FIG. 7B shows images of CRIS numerically reconstructed as a function of the relative pupil 40 area. The large image represents CRIS reconstructed at a relative pupil 40 area of 1.3, corresponding to point F in FIG. 7A. The smaller images represent enlarged views corresponding to the labeled points in FIG. 7A. In the enlarged images, a decline in image quality was observed, but the difference was not noticeable in the overall images.

FIG. 7C is a graph representing computation time. In FIG. 7C, "ITER" refers to traditional iterative methods using stochastic gradient descent, "Raw" represents CRIS synthesis without optimization, and "OPT" represents CRIS synthesis with applied optimization.

During CRIS synthesis, only the propagated light passing through pupil 40 area AAA contributes to the reconstruction. Changes in the pupil 40 area resulted in variations in reconstructed intensity, leading to a decline in image quality (FIG. 7A).

Since the pupil 40 area varies with brightness, it is possible to compensate for the pupil 40 area used in synthesis by detecting ambient brightness. However, even under fixed ambient brightness, emotional arousal may cause up to ±20% changes in the individual's pupil 40 area.

Numerical simulations showed that a ±20% change in the pupil 40 area could reduce the PSNR by up to 2 dB, which was insignificant in most cases due to the transient nature of the change. Estimating a 3 dB reduction in PSNR, the FWHM of the relative pupil 40 area was approximately 51%. Furthermore, since the added and subtracted light is incoherent, patterns such as interference and speckle were not observed in reconstructions with mismatched pupil 40 areas (FIG. 7B).

* CRISNet Training

Real-time synthesis of CRIS was achieved using CRIS-Net, adopting unsupervised learning for optimal image quality.

The primary computational challenge involved calculating coherent propagation for various incident angles using an extended Fourier domain to accommodate off-axis propagation. By optimizing numerical reconstruction, such as randomly selecting incident angles between 100° and 300° instead of covering 400°, and utilizing cached tensors, computation time was reduced to 14.7%.

CRISNet was trained with an optimized reconstruction method, further reducing computation time by a factor of $\frac{1}{40,000}$. It operated at 57 Hz on an NVIDIA RTX4090 without image quality degradation.

The network was trained using the ADAM optimizer with a learning rate of 0.0001 over 100 epochs. The DIV2K training dataset was used to train CRISNet.

Figure 8A:
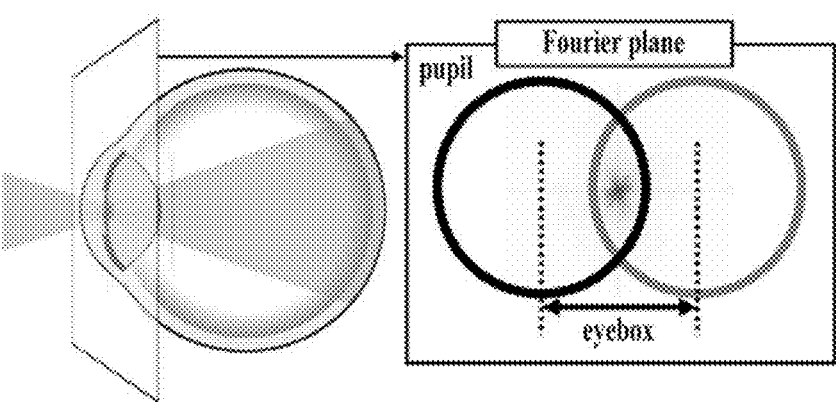
FIGS. 8A to 8C illustrate the eye box calculation process of holograms in prior art.
Figure 8B:
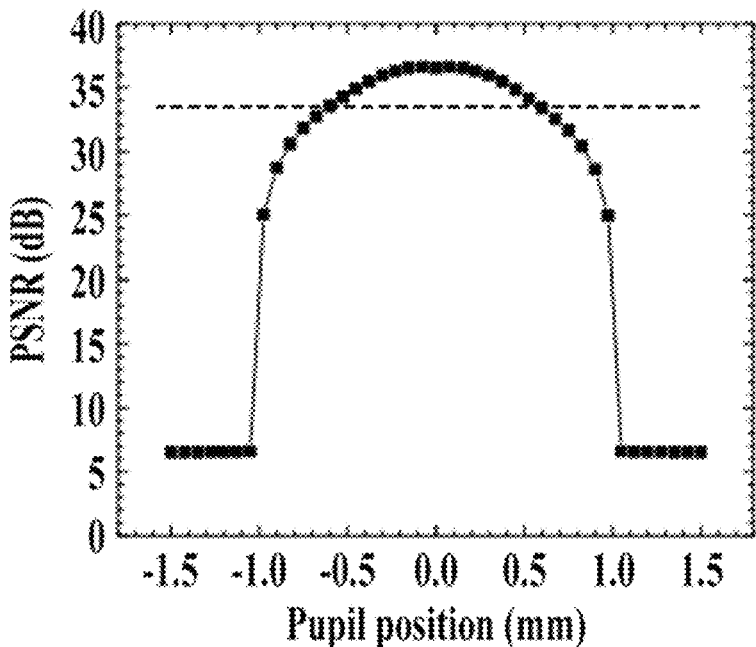
Figure 8C:
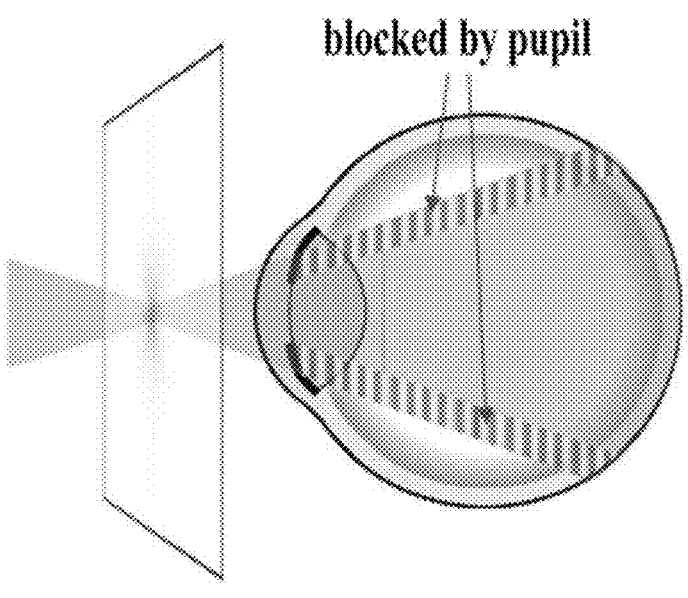

FIGS. 8A to 8C illustrate the eye box calculation process of holograms in prior art.

FIG. 8A shows the Fourier-transformed hologram and the intensity of the first light at pupil 40. When the shifted distance of pupil 40 is similar to its radius, the hologram is partially blocked.

FIG. 8B depicts the PSNR as a function of pupil 40 position. The diameter of pupil 40 was set to 2 mm. The hologram was synthesized using the DIV2K validation dataset with ASM and replayed with an ideal composite spatial light modulator 20.

FIG. 8C illustrates a hologram blocked due to movement along the z-axis.

There are two methods for estimating the eye box size of conventional holograms. The first method uses the diffraction limit, while the second method involves numerically calculating image quality, similar to CRIS.

The eye box size based on the diffraction limit is given by fλ/Xx, where f is the focal length of the lens, λ is the wavelength, and x is the pixel pitch.

For each wavelength used in the experiment, the radial eye box sizes are 1.5 mm, 1.7 mm, and 2.1 mm. Since the overall eye box is limited by the smallest size, the radial length of the eye box is 1.5 mm.

Meanwhile, the eye function estimated based on image quality may be calculated by assuming the pupil is located on the Fourier plane (FIG. 1A).

In a spatially coherent light source, when the pupil moves away from the center, high-frequency components are partially blocked by the pupil. These blocked components result in a decline in image quality, and the FWHM (Full Width at Half Maximum) of image quality may be determined at the point where the average PSNR decreases by 3 dB (see FIG. 1B).

Numerical calculations show that the radial eye box length is approximately 1.2 mm.

The length of the eye box along the z-axis may be calculated by considering the blocked region when the pupil moves along the z-axis (FIG. 1C). The half-length of the eye box along the z-axis is defined as (2/FoV)×pr, where pr is the radial eye box length.

The eye box size estimated based on image quality may also be used for comparison with CRIS.

Generalization of Translational Invariance Along the z-Axis

By assuming the Fourier-transformed wavefield on the plane of the spatial light modulator 20 as $\overline{U}(k_x, k_y, 0)$, the wavefield at the retina may be expressed as Equation 18.

[Equation 18]

$$U(x'', y'', f+f+p_z+f') =$$

$$\frac{H_0(2f+p_z+f')}{(2\pi)^5} \int\int e^{-if'\frac{k_x''^2+k_y''^2}{2k}}$$

-continued $$\int\int e^{-ik\frac{x'^2+y'^2}{2f'}} \int\int e^{-i(f+p_z)\frac{k_x'^2+k_y'^2}{2k}} \times \int\int e^{-ik\frac{x^2+y^2}{2f}}$$

$$\int\int e^{-if\frac{k_x^2+k_y^2}{2k}} \overline{U}(k_x, k_y, 0)e^{ik_xx+ik_yy}dk_xdk_ye^{-ik_x'x-ik_y'y}dxdy \times$$

$$e^{ik_x'x'+ik_y'y'} dk_x'dk_y'e^{-ik_x''x'-ik_y''y'} dx'dy' e^{ik_x''x''+ik_y''y''} dk_x''dk_y'',$$

Here, $H_0(d)=e^{-ikd}$, and the coordinates follow the notation shown in FIG. 6. Equation 18 is derived under the assumption that the wavefield undergoes the following steps:
1. Propagation over a distance f
2. Phase change by the lens $$\left(e^{-ik\frac{x^2+y^2}{2f}}\right)$$

3. Propagation over a distance f+pz
4. Phase change by the eye lens $$\left(e^{-ik\frac{x'^2+y'^2}{2f'}}\right)$$

5. Propagation over a distance fç

During these steps, Fourier transforms and inverse Fourier transforms are applied to the wavefield.

To simplify the equation, the following Equation 19 may be used.

[Equation 19]

$$\int\int e^{ia(x^2+y^2)}e^{ibx+icy}dxdy =$$

$$\int\int e^{ia\left(x^2+\frac{b}{a}x+\left(\frac{b}{2a}\right)^2+y^2+\frac{c}{a}y+\left(\frac{c}{2a}\right)^2\right)}e^{-ia\left(\left(\frac{b}{2a}\right)^2+\left(\frac{c}{2a}\right)^2\right)}dxdy =$$

$$e^{-i\frac{b^2+c^2}{4a}}\int\int e^{ia(x^2+y^2)}dxdy \equiv C(a)e^{-i\frac{b^2+c^2}{4a}}$$

By doubling Equation 19, Equation 18 is transformed into Equation 20.

[Equation 20]

$$U(x'', y'', f+f+p_z+f') =$$

$$\frac{H_0(2f+p_z+f')}{(2\pi)^5}\int\int\int\int\int\int\int\int e^{-if'\frac{k_x''^2+k_y''^2}{2k}} \times$$

$$e^{-ik\frac{x'^2+y'^2}{2f'}}e^{-i(f+p_z)\frac{k_x'^2+k_y'^2}{2k}}e^{-ik\frac{x^2+y^2}{2f}}e^{-if\frac{k_x^2+k_y^2}{2k}}e^{ik_xx+ik_y} \times$$

$$e^{-ik_x'x-ik_y'y}e^{ik_x'x'+ik_y'y'}e^{-ik_x''x'-ik_y''y'} \times e^{i(k_x''x''+k_y''y'')}$$

$$\overline{U}(k_x, k_y, 0)dk_xdk_ydk_x'dk_y'dk_x''dk_y''dxdydx'dy' =$$

$$\frac{H_0(2f+p_z+f')}{(2\pi)^5}\int\int\int\int\int\int\int\int e^{-if'\frac{k_x''^2+k_y''^2}{2k}}$$

$$e^{-ik\frac{x'^2+y'}{2f'}} \times e^{-i(f+p_z)\frac{k_x'^2+k_y'^2}{2k}}e^{-if\frac{k_x^2+k_y^2}{2k}}C\left(-\frac{k}{2f}\right) \times$$

$$e^{i\frac{(k_x-k_x')^2+(k_y-k_y')^2}{2k/f}}e^{i(k_x'x'+k_y'y')}e^{-i(k_x''x'+k_y''y')} \times$$

$$e^{i(k_x''x''+k_y''y'')}\overline{U}(k_x, k_y, 0)dk_xdk_ydk_x'dk_y'dk_x''dk_y''dx'dy' =$$

-continued $$\frac{H_0(2f + p_z + f')}{(2\pi)^5} \int \cdots \int e^{-if\frac{k_x''^2 + k_y''^2}{2k}} e^{-i(f + p_z)\frac{k_x'^2 + k_y'^2}{2k}} \times$$

$$e^{-if\frac{k_x^2 + k_y^2}{2k}} e^{i(k_x'' x'' + k_y'' y'')} C\left(-\frac{k}{2f}\right) \times e^{i\frac{(k_x - k_x')^2 + (k_y - k_y')^2}{2k/f}} C\left(-\frac{k}{2f'}\right)$$

$$e^{i\frac{(k_x' - k_x'')^2 + (k_y' - k_y'')^2}{2k/f'}} \times U(k_x, k_y, 0) dk_x dk_y dk_x' dk_y' dk_x'' dk_y''$$

In Equation 20, since $$k_x''$$

and are linear, the integral may be replaced with a δ-function. That is, $$\int \int e^{i(k_x'' x'' + k_y'' y'')} e^{i\frac{-2k_x' k_x'' - 2k_y' k_y''}{2k/f'}} dk_x'' dk_y'' = (2\pi)^2 \delta(x'' - k_x' f'/k) \delta(y'' - k_y' f'/k).$$

Accordingly, Equation 20 is simplified into Equation 21.

[Equation 21]

$$U(x'', y'', f + f + p_z + f') =$$

$$\frac{H_0(2f + p_z + f')}{(2\pi)^3} C\left(-\frac{k}{2f}\right) C\left(-\frac{k}{2f'}\right) \times$$

$$\int \int e^{-i(f + p_z)\frac{(x'' k/f')^2 + (y'' k/f')^2}{2k}} e^{-if\frac{k_x^2 + k_y^2}{2k}} \times$$

$$e^{i\frac{\left(k_x - \frac{x'' k}{f'}\right)^2 + \left(k_y - \frac{y'' k}{f'}\right)^2}{2k/f}} e^{i\frac{\left(\frac{x'' k}{f'}\right)^2 + \left(\frac{y'' k}{f'}\right)^2}{dk/f'}} \times U(k_x, k_y, 0) dk_x dk_y =$$

$$\frac{H_0(2f + p_z + f')}{(2\pi)^3} C\left(-\frac{k}{2f}\right) C\left(-\frac{k}{2f'}\right)$$

$$e^{-i(f + p_z)\frac{(x'' k/f')^2 + (y'' k/f')^2}{2k}} \times$$

$$e^{i\frac{(x'' k/f')^2 + (y'' k/f')^2}{2k/f}} e^{i\frac{(x'' k/f')^2 + (y'' k/f')^2}{2k/f}} \times$$

$$\int \int e^{-ik_x x''\left(\frac{f}{f'}\right) - ik_y y''\left(\frac{f}{f'}\right)} U(k_x, k_y, 0) dk_x dk_y =$$

$$\frac{1}{N_0} \int \int e^{-ik_x x''\left(\frac{f}{f'}\right) - ik_y y''\left(\frac{f}{f'}\right)} U(k_x, k_y, 0) dk_x dk_y$$

Here, $N_0$ includes all phase factors that are ignored during the intensity calculation. The last line of Equation 21 is identical to Equation 11.

* Number of Incident Angles

Figure 9A:
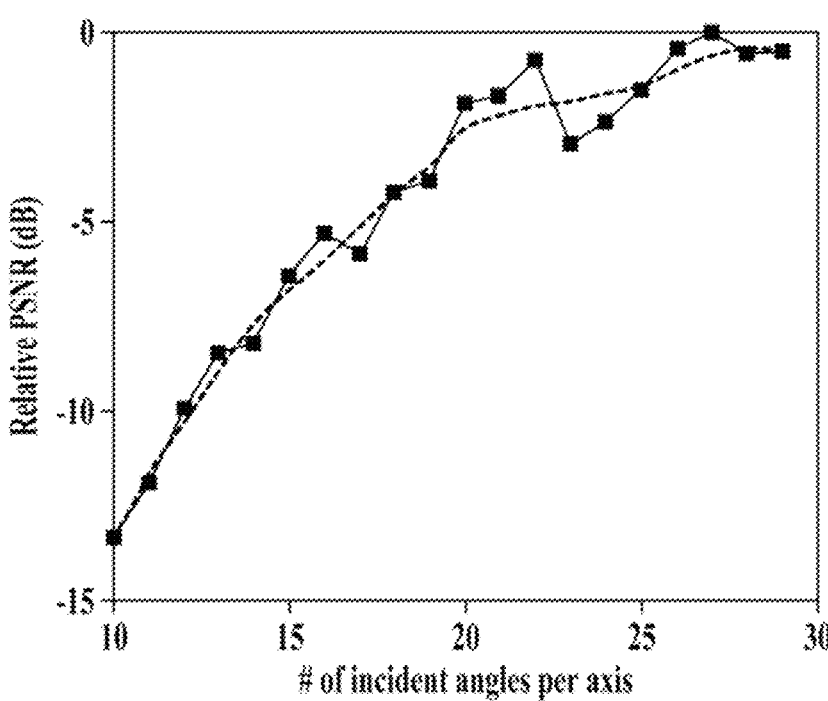
FIGS. 9A and 9B are graphs showing relative PSNR as a function of NoIA (Number of Incident Angles).
Figure 9B:
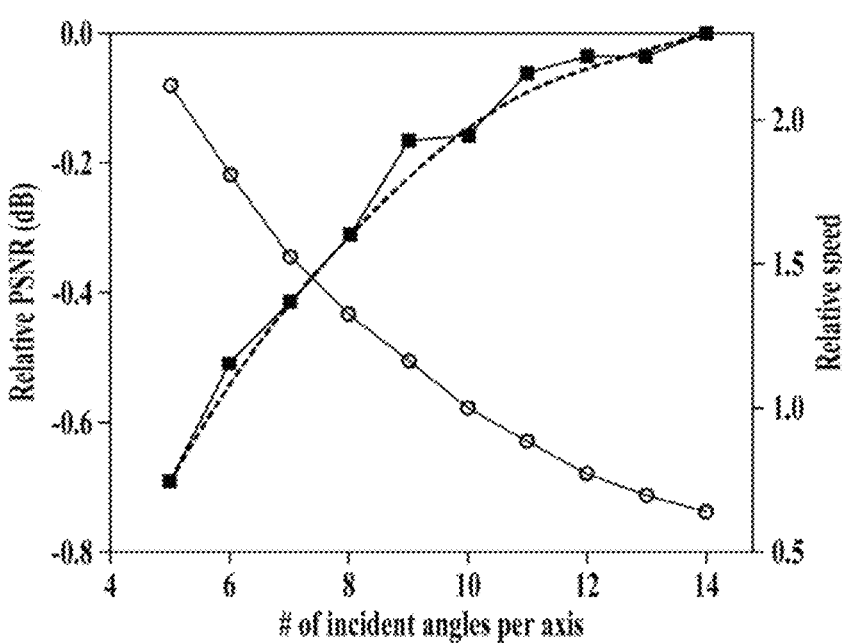

FIGS. 9A and 9B are graphs showing relative PSNR as a function of NoIA (Number of Incident Angles).

FIG. 9A shows the relative PSNR of numerical reconstruction as a function of NoIA per axis. The dashed line represents values smoothed using the adjacent averaging method. FIG. 9B depicts the relative PSNR of synthesized CRIS as a function of the minimum NoIA per axis.

To numerically simulate the propagation of incoherent light, coherent propagation is calculated for all incident angles, and all coherent propagation results are added incoherently. Ideally, simulating incoherent light numerically requires an infinite number of incident angles (NoIA).

However, 400 NoIA produces results similar to much larger numbers, making 400 the standard NoIA (FIG. 9A).

More specifically, the 2D domain of NoIA is divided into a regular grid, ensuring that each axis has the same number of divisions. To reduce the optimization time for CRIS, NoIA was selected randomly.

First, to maximize the effect of selecting different numbers, fractional values were chosen based on the difference between the minimum and maximum ranges. Among them, 2 and 3 appeared insufficient, and 5 was avoided because it is a multiple of 10. Thus, the difference between the minimum and maximum was set to 7. Subsequently, to find the optimal minimum value, CRIS was synthesized using NoIA ranges from x to x+7, where xxx could range from 5 to 14 (FIG. 9B). To analyze the synthesized CRIS based on NoIA ranges, the PSNR of the synthesized CRIS was evaluated using 400 NoIA. To achieve sufficient speed while providing reasonable PSNR, x=10 was selected.

Figure 10:
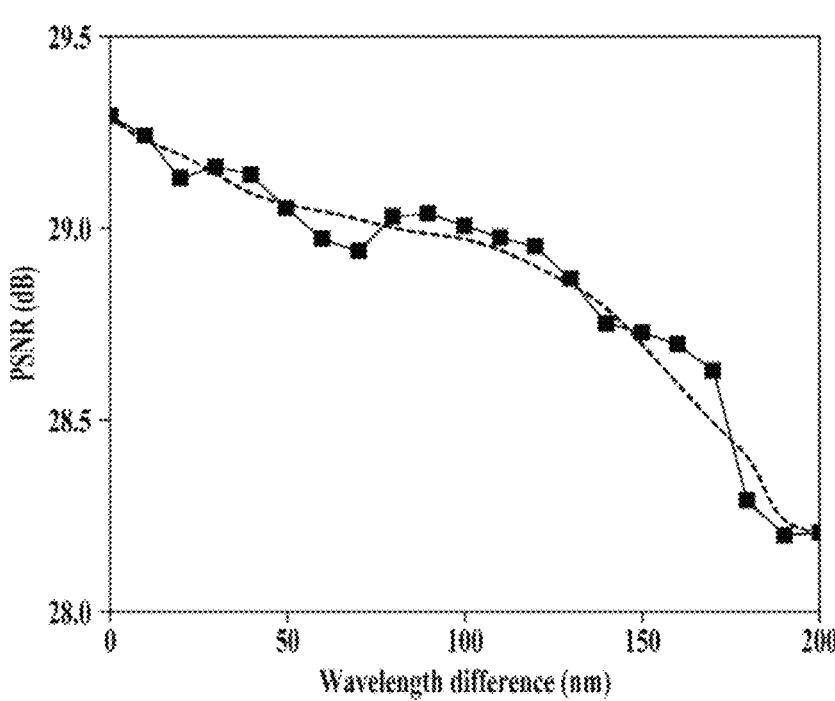
FIG. 10 is a graph illustrating PSNR according to wavelength differences.

FIG. 10 is a graph showing PSNR as a function of wavelength differences.

The wavelength difference represents the gap between the wavelength used in synthesis and the wavelength used in reconstruction for all three colors. The red dashed line represents values smoothed using the adjacent averaging method.

* Wavelength Dependence of CRIS

In CRIS reconstruction, temporal coherence is maintained, but CRIS may still be successfully reconstructed even in cases of temporal incoherence, provided the spectral bandwidth is not excessively wide. FIG. 10 shows the average PSNR as a function of the wavelength difference between the wavelength used in synthesis and the wavelength used in reconstruction.

When the wavelength difference is as large as 100 nm, the PSNR degradation is only about 0.5 dB. Therefore, using LED light sources minimizes degradation in the reconstructed image quality.

Figure 11A:
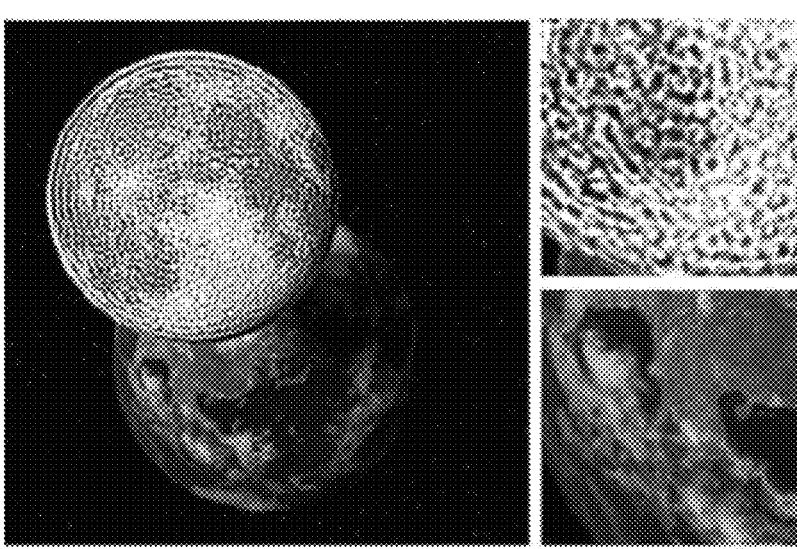
FIGS. 11A and 11B are diagrams showing the numerically reconstructed intensity of the first light, including additional losses.
Figure 11B:
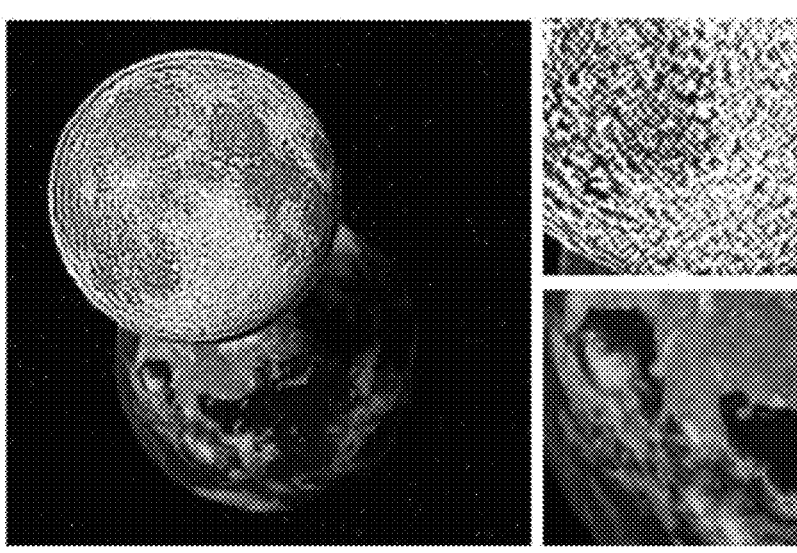

FIGS. 11A and 11B are diagrams showing the numerically reconstructed intensity of the first light, including additional losses.

FIG. 11A depicts the numerically reconstructed intensity focused on the spatial light modulator 20 plane without L DB, while FIG. 11B shows the numerically reconstructed intensity focused on the spatial light modulator 20 plane using L DB.

* Additional Loss to Enhance Defocus Blur

To demonstrate improvements in defocus blur, Equation 22 was adopted as the defocus blur loss function.

$$\mathcal{L}_{DB} = -\alpha \left| \frac{\nabla I(x, y)}{I(x, y) + 1} \right| + \beta |\nabla I_G(x, y; \sigma)| \qquad \text{[Equation 22]}$$

Here, I(x,y) represents the intensity of the numerically reconstructed CRIS on the spatial light modulator 20 plane, $I_G(x, y, \sigma)$ is the Gaussian blur intensity with a sigma value σ, and α(·) is a user-selected constant.

The first term of Equation 22 enhances speckles, similar to phase-only holograms. Simultaneously, the second term reduces the overall gradient by excluding speckle patterns through Gaussian blur, thereby improving defocus blur.

FIG. 11 shows reconstructed images with defocus blur loss adopted at σ=1, α=1, and β=0.005. The demonstrated loss function is an example of an additional loss function used to enhance defocus blur.

The present invention may also be configured to achieve natural defocus blur.

Figure 12:
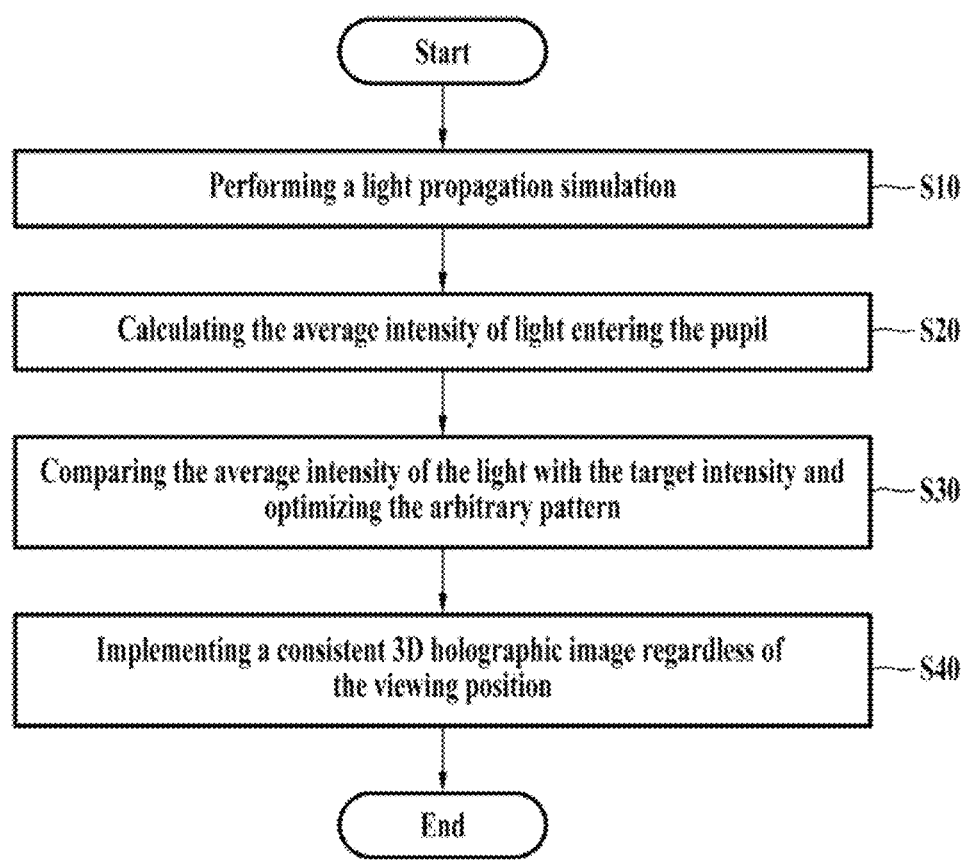
FIG. 12 is a flowchart of a hologram generation method according to another embodiment of the present invention.

FIG. 12 is a flowchart of a hologram generation method according to another embodiment of the present invention.

As shown in FIG. 12, the hologram generation method of the present embodiment, implemented through the holographic display 1 described in FIGS. 1 to 8, may include: a first step (S10) of performing a light propagation simulation, a second step (S20) of calculating the average intensity of light incident into the pupil, a third step (S30) of optimizing an arbitrary pattern by comparing the average intensity of light with the target intensity, and a fourth step (S40) of implementing a consistent 3D holographic image regardless of the viewing position.

The first step (S10) of performing the light propagation simulation may involve inputting arbitrary RGB-D video signals into the spatial light modulator 20, which receives light from the light source 10, and performing a light propagation simulation where the first light, which is the Coherently-reconstructed Incoherent Sum (CRIS) generated as coherent light by the spatial light modulator 20, propagates over a certain distance.

The second step (S20) of calculating the average intensity of light incident into the pupil 40 may involve simulating the angles of light entering pupil 40 and calculating the average intensity of the first light incident at those angles.

The third step (S30) of optimizing an arbitrary pattern by comparing the average intensity of light with the target intensity may involve optimizing the arbitrary pattern by comparing the average intensity of the first light with the intensity of the target second light.

The first light may be generated based on Equation 1.

The fourth step (S40) of implementing a consistent 3D holographic image regardless of the viewing position may involve ensuring translational invariance so that the intensity of the first light remains the same regardless of the movement of the pupil's position.

The translational invariance of the first light may be expressed by introducing the positional vector of the pupil relative to the center of the eye box (px, py, pz) as follows:

$$I_{CRIS}(\vec{r}, z, px, py, pz) = I_{CRIS}(\vec{r}, z, 0, 0, 0),$$

where $$I_{CRIS}(\vec{r}, z)$$

represents the intensity of the first light, z is the distance along the longitudinal direction, and the Fourier transform function $$U(\vec{k})$$

satisfying $$I_{CRIS}(\vec{r}, z) = I_{target},$$

with $I_{target}$ being the intensity of the second light, which is the incoherent sum of the target light, may be derived and implemented.

The present invention provides a novel passive method to overcome the limited eye box of holographic displays while delivering image quality and responsiveness comparable to conventional displays. It utilizes incoherent light that may be decomposed into a sum of coherent light to expand the eye box. This invention theoretically proves the translational invariance of CRIS (Coherently-Reconstructed Incoherent Sum) and derives an eye box formula consistent with numerical simulation results.

According to the formula, the expanded volume of CRIS was 1,000 times larger than the unexpanded eye box without degradation in image quality. To validate the theory, 3D reconstruction and the translational invariance of CRIS were experimentally demonstrated. However, due to the limited numerical aperture of the proof-of-concept experimental setup, the eye box expansion was restricted to 32 times.

Additionally, simulating the sum of incoherent light requires hundreds of coherent propagations and significantly more computational resources than conventional holograms. To address this, a neural network model for real-time synthesis was developed. By solving key challenges such as image quality, real-time synthesis, eye box limitations, and responsiveness, CRIS may enable the widespread adoption of holographic displays.

This invention may be applied to various fields, including HMDs (head-mounted displays), VR (virtual reality), and AR (augmented reality).

As described above, the embodiments of the present invention have been explained with specific details such as concrete components and limited examples and drawings. These are provided solely to facilitate a better understanding of the invention and are not intended to limit the invention to the described embodiments.

Those skilled in the art to which this invention pertains will understand that various modifications and variations may be made based on the described disclosures. Accordingly, the scope of the present invention should not be construed as limited to the disclosed embodiments. Rather, it should encompass all equivalents or equivalent modifications within the scope of the appended claims and their equivalents.

DESCRIPTION OF SYMBOLS

1: Holographic Display
10: Light Source
11: Light (emitted from different points of the light source)
20: SLM (Spatial Light Modulator)
30: Lens
40: Pupil
41: Pupil Plane
What is claimed is:
1. A holographic display comprising:
a light source configured to emit incoherent light;
a spatial light modulator (SLM) disposed at a Fourier plane of the light source and configured to modulate the incoherent light and emit the modulated incoherent light as diffused light; and
at least one lens disposed downstream of the spatial light modulator and configured to focus the modulated incoherent light,
wherein the spatial light modulator receives an RGB-D image signal and converts the incoherent light array incident from the light source into a first light, which is a coherently-reconstructed incoherent sum (CRIS) for implementing a 3D hologram.

2. The holographic display of claim 1, wherein the lens is arranged to direct the first light, for generating a 3D hologram, into a pupil located at the Fourier plane of the spatial light modulator.

3. The holographic display of claim 1, wherein the first light is expressed as:

$$I_{CRIS}(\vec{r}, z) = \frac{1}{N} \sum_{\vec{k}_g} \left| \int_A U(\vec{k} + \vec{k}_g) e^{iz\sqrt{\left(\frac{2\pi}{\lambda}\right)^2 - |\vec{k}|^2}} e^{i\vec{k}\cdot\vec{r}} d\vec{k} \right|^2$$

where ICRIS($\vec{r}$,z) is the intensity of the first light, z is the distance along the longitudinal direction, N is a normalization constant, $\vec{r}$ is the distance vector from the center of the spatial light modulator, U($\vec{r}$) is the Fourier transform function of the modulation signal of the spatial light modulator, $\vec{k}$ is the radial wavevector before modulation, $\vec{k}_g$=($k_x$, $k_y$) is the modulated radial wavevector, and A is the area of the pupil of the Fourier plane (pupil plane), wherein the first light is generated by deriving a Fourier transform function U($\vec{k}$) that satisfies $$I_{CRIS}(\vec{r}, z) = Itarget$$

where Itarget is the intensity of the second light, which is the incoherent sum of the target light.

4. The holographic display of claim 1, wherein the first light exhibits translational invariance, wherein the intensity of the first light remains constant regardless of the positional shift of the pupil.

5. The holographic display of claim 4, wherein the translational invariance is expressed by introducing a positional vector of the pupil with respect to the center of the eye box (px, py, pz), wherein $$I_{CRIS}(\vec{r}, z, p_x, p_y, p_z) = I_{CRIS}(\vec{r}, z, 0, 0, 0)$$

where $I_{CRIS}(\vec{r}, z)$ is the intensity of the first light, and z is the distance along the longitudinal direction, and wherein the first light is implemented by deriving a Fourier transform function U(k) that satisfies $$I_{CRIS}(\vec{r}, z) = I_{target}$$

where Itarget is the intensity of the second light, which is the incoherent sum of the target light.

6. A method for generating a hologram using the holographic display of claim 1, comprising:
   a first step of performing an optical propagation simulation to propagate, over a predetermined distance, first light that is a coherently-reconstructed incoherent sum (CRIS) generated by the spatial light modulator upon receiving light from the light source, wherein an arbitrary RGB-D image signal for implementing the hologram is input to the spatial light modulator;
   a second step of simulating the angles of light incident within the pupil and calculating the average intensity of the first light incident at each of the simulated angles; and
   a third step of optimizing the arbitrary pattern by comparing the average intensity of the first light with the intensity of second light as the target light.

7. The method for generating a hologram of claim 6, wherein the first light is expressed as:

$$I_{CRIS}(\vec{r}, z) = \frac{1}{N} \sum_{\vec{k}_g} \left| \int_A U(\vec{k} + \vec{k}_g) e^{iz\sqrt{\left(\frac{2\pi}{\lambda}\right)^2 - |\vec{k}|^2}} e^{i\vec{k}\cdot\vec{r}} d\vec{k} \right|^2$$

where ICRIS($\vec{r}$, z) is the intensity of the first light, zzz is the distance along the longitudinal direction, NNN is a normalization constant, $\vec{r}$ is the distance vector from the center of the spatial light modulator, U($\vec{k}$) is the Fourier transform function of the modulation signal of the spatial light modulator, $\vec{k}_g$ is the radial wavevector before modulation, $\vec{k}_g$=($k_x$, $k_y$) is the modulated radial wavevector, and A is the area of the pupil in the Fourier plane, and wherein the first light is generated by deriving a Fourier transform function U($\vec{k}$) that satisfies $$ICRIS(\vec{r}, z) = Itarget$$

where Itarget is the intensity of the second light, which is the incoherent sum of the target light.

8. The method for generating a hologram of claim 6, wherein the first light exhibits translational invariance, whereby the intensity of the first light remains constant regardless of the positional shift of the pupil.

9. The method for generating a hologram of claim 8, wherein the translational invariance of the first light is expressed by introducing a positional vector of the pupil with respect to the center of the eye box (px,py, pz), wherein $$I_{CRIS}(\vec{r}, z, p_x, p_y, p_z) = I_{CRIS}(\vec{r}, z, 0, 0, 0)$$

where $I_{CRIS}(\vec{r}, z)$ is the intensity of the first light, and z is the distance along the longitudinal direction, and wherein the first light is implemented by deriving a Fourier transform function U($\vec{k}$) that satisfies $$I_{CRIS}(\vec{r}, z) = I_{target}$$

where Itarget is the intensity of the second light, which is the incoherent sum of the target light.

10. The method for generating a hologram of claim 6, wherein, in the third step, the first light formed by the spatial light modulator based on the optimized arbitrary pattern is incident on a pupil positioned at the Fourier plane of the spatial light modulator via a lens.

* * * * *